(12) United States Patent
Tsubaki

(10) Patent No.: US 11,896,032 B2
(45) Date of Patent: Feb. 13, 2024

(54) AGENT FOR IMPROVING FEED CONVERSION RATE, AGENT FOR IMPROVING SURVIVAL RATE, AGENT FOR IMPROVING THE NUMBER OF EGGS LAID BY EGG-LAYING HEN, AND METHOD OF GIVING SAME TO ANIMALS, AND FEED

(71) Applicant: Tsubakisangyo Co., Ltd., Ota (JP)

(72) Inventor: Kazuo Tsubaki, Ota (JP)

(73) Assignee: Tsubakisangyo Co., Ltd., Ota (JP)

( * ) Notice: Subject to any disclaimer, the term of this patent is extended or adjusted under 35 U.S.C. 154(b) by 508 days.

(21) Appl. No.: 16/303,985

(22) PCT Filed: May 25, 2017

(86) PCT No.: PCT/JP2017/019539
§ 371 (c)(1),
(2) Date: Nov. 21, 2018

(87) PCT Pub. No.: WO2017/204297
PCT Pub. Date: Nov. 30, 2017

(65) Prior Publication Data
US 2020/0329738 A1      Oct. 22, 2020

(30) Foreign Application Priority Data
May 26, 2016   (JP) ................. 2016-105486

(51) Int. Cl.
*A23K 20/142*      (2016.01)
*A23K 50/75*       (2016.01)
(52) U.S. Cl.
CPC ............ *A23K 20/142* (2016.05); *A23K 50/75* (2016.05)

(58) Field of Classification Search
CPC .... A23K 50/00; A23K 20/142; A61K 31/195; A61K 2300/00
See application file for complete search history.

(56) References Cited

U.S. PATENT DOCUMENTS

| 2,927,859 A | 3/1960 | Gordon |
|---|---|---|
| 2004/0266862 A1 | 12/2004 | Wolf et al. |

(Continued)

FOREIGN PATENT DOCUMENTS

| CN | 102223809 A | 10/2011 |
|---|---|---|
| CN | 102178065 B | 8/2012 |

(Continued)

OTHER PUBLICATIONS

Maw, Biochemistry of S-Methyl-L-Cysteine and its Principal Derivatives (https://www.tandfonline.com/doi/abs/10.1080/01961778208082422) (Year: 2007).*

(Continued)

*Primary Examiner* — Erik Kashnikow
*Assistant Examiner* — Lela S. Davis
(74) *Attorney, Agent, or Firm* — Crowell & Moring LLP

(57) ABSTRACT

An agent for improving a feed conversion rate, an agent for improving a survival rate, an agent for improving the number of eggs laid by an egg-laying hen, a method of giving these agents to animals, and a feed which can directly and significantly improve the productivity of livestock farms are provided. At least one effective ingredient selected from cysteine and cysteine derivatives is given to animals. The effective ingredient may be added to drinking water, or may be added to the feed. Examples of the cysteine and cysteine derivatives can include acetylcysteine (NAC), S-methyl-L-cysteine (SMC), cysteine malate, and acetylcysteine amide.

2 Claims, 12 Drawing Sheets

(56) References Cited

U.S. PATENT DOCUMENTS

| | | | |
|---|---|---|---|
| 2007/0172514 A1* | 7/2007 | Chi | A23K 50/30 424/442 |
| 2010/0092428 A1 | 4/2010 | Schmidt et al. | |
| 2011/0269827 A1 | 11/2011 | Frantz | |
| 2014/0170222 A1 | 6/2014 | Reznik et al. | |
| 2014/0205738 A1 | 7/2014 | Mitarai | |

FOREIGN PATENT DOCUMENTS

| | | |
|---|---|---|
| CN | 103070294 A | 5/2013 |
| CN | 104137951 A | 11/2014 |
| CN | 104351478 A | 2/2015 |
| CN | 104738355 A | 7/2015 |
| JP | 2012-513766 A | 6/2012 |
| JP | 2015-205896 A | 11/2015 |
| JP | 2016-505593 A | 2/2016 |
| WO | WO 2005/035477 A1 | 4/2005 |
| WO | WO 2013/031691 A1 | 3/2013 |

OTHER PUBLICATIONS

CN104351478A machine translation (Year: 2015).*
He et al., CN104738355 machine translation (Year: 2015).*
Lara, et al. Impact of Heat Stress on Poultry Production (Year: 2013).*
Munks, et al., Amino Acids in the Production of Chicken Egg and Muscle (Year: 1945).*
Klober, Eggs: Tips to Boost Production, https://www.ecofarmingdaily.com/raise-healthy-livestock/chickens/eggs-tips-to-boost-production/ (Year: 2015).*
Valdivia et al., Efficacy of N-Acetylcysteine to Reduce the Effects of Aflatoxin B1 Intoxication in Broiler Chickens (Year: 2001).*
Chen, et al., Aflatoxins in Poultry, https://www.extension.purdue.edu/extmedia/AS/AS-615-W.pdf (Year: 2013).*
https://www.merriam-webster.com/dictionary/hen (Year: 2022).*
International Search Report (PCT/ISA/210) issued in PCT Application No. PCT/JP2017/019539 dated Aug. 22, 2017 with English translation (five (5) pages).
Japanese-language Written Opinion (PCT/ISA/237) issued in PCT Application No. PCT/JP2017/019539 dated Aug. 22, 2017 (four (4) pages).
Japanese-language Office Action issued in counterpart Japanese Application No. 2017-529855 dated Jul. 31, 2018 with English Abstract (five (5) pages).
Japanese-language Refusal issued in counterpart Japanese Application No. 2017-529855 dated Jan. 9, 2018 with English Abstract (five (5) pages).
Bunchasak, C., et al., "The Effect of Supplementing Cystine on the Growth Performance and Liver Lipid and Phospholipid Contents of Broiler Chicks", Journal of the Japanese Institute of Poultry, 1998, pp. 60-66, vol. 35, Issue No. 1 (seven (7) pages).
Ozaki Y., "Ab Initio SCF MO Study of the Molecular Structure and Conformational Stability Methylsilanethiol", The Chemical Society of Japan, 1986, pp. 1371-1376 with English Abstract (eight (8) pages).
Taeuchi, T., "Synthetic Taurine is Good Healthy Supplement for Fish!" The Japan Society of Fisheries Journal, 2010, pp. 298-303, vol. 76, Issue No. 2 with English Abstract (eight (8) pages).
Hosoya S. et al., "Defend Against Chicken's Heat Stress (2) ~ Measures Against Summer Due to Antioxidants-", National Federation of Agricultural Cooperative Associations, 2014, pp. 48-51, vol. 89 Issue 6, Central Research Institute for Animal Husbandry, Poultry Laboratory with English Abstract (six (6) pages).
Extended European Search Report issued in European Application No. 17802883.3 dated Feb. 14, 2020 (33 pages).
Shinzato et al., "Effects of L-cysteine supplementation on growth performance and ruminal fermentation in growing steers in comparison to monensin", International Congress Series, Jul. 1, 2006, pp. 189-192, vol. 1293, Elsevier, XP027936179, four pages.
European Office Action issued in European Application No. 17 802 883.3 dated Sep. 15, 2020 (five pages).
Chinese-language Office Action issued in Chinese Application No. 201780032419.7 dated Dec. 28, 2021 (18 pages).
Chinese-language Office Action issued in Chinese Application No. 201780032419.7 dated Jun. 6, 2022 with English translation (15 pages).
Impact of Composite Additives on Playing Performance in Heat Stress Open Chickens, Haddrine et al., Bulletin of the Gibberella College (Natural Science Edition), vol. 28, No. 12, pp. 36-38, dated Dec. 30, 2012 (three (3) pages).

* cited by examiner

Fig. 1

Akagikougen 17 Up for adult chicken

| | | Label |
|---|---|---|
| Production date and year | April, Heisei 28 | |
| Name of feed | Kumiai Blend Feed<br>Akagikougen 17 Up for adult chicken | |
| Feed type | Blend feed for raising adult chicken | |
| Name and address of producer | JA higashinihon kumiai shiryou K.K.<br>818 Higashisinmachi, Ohtashi, Gunma | |
| Name and address of production place | Kashima Factory, JA higashinihon kumiai shiryou K.K.<br>3 Higashifukasiba, Kamisushi, Ibaraki | |
| Target animal | Adult chicken (chicken after starting egg laying (excluding breeding hen)) | |
| Net weight | 15,000 kg | |
| Amounts of ingredients | crude protein | 17.0% or more |
| | crude fat | 3.0% or more |
| | crude fiber | 5.0% or less |
| | crude ash | 14.5% or less |
| | calcium | 2.80% or more |
| | phosphorus | 0.45% or more |
| | in 1 kg of metabolic energy | 2,840 Kcal or more |

Names of feed additives contained
iron sulfate, copper sulfate, manganese sulfate, zinc carbonate, calcium iodate, vitamin A, vitamin D3, vitamin E, vitamin B1, vitamin B2, pantothenic acid, vitamin B12, nicotinic acid, folic acid, vitamin B6, biotin, vitamin K3, ethoxyquin, choline, phytase, methionine

| Names of raw materials and others | | |
|---|---|---|
| Items of raw materials | Blend proportion | Names of raw materials |
| Cereals | 52% | corn, polished white rice, cornstarch |
| Vegetable oil cakes | 22% | soybean oil cake, rapeseed oil cake |
| Bran and residue | 11% | corn distillers grain solubles, rice bran |
| Animal-derived feed | 1% | fish meal |
| Others | 14% | calcium carbonate, animal fat and oil, calcium phosphate, dietary salt, paprika extract, zeolite, Japanese mugwort powder, seaweeds, refined wood vinegar, silica anhydride, Bacillus subtilis, fermented plant powder, fermented milk powder |

(Note) Names of raw materials are shown in descending order of the blend proportion in principle.

Notes
1. This feed can be used only for those shown under "Target animal" above.
2. The animal fat and oil used in the raw materials for this feed are verified animal fat and oil (including those derived from ruminants).

Notes for usage and storage
1. Do not use this feed for cattle, ewe, goat, and deer (Be careful that use for cattle, ewe, goat, and deer will be subjected to punishment.).
2. Store this feed so as to avoid mixing of this feed with the feeds for cattle, ewe, goat, and deer (including raw materials and materials for producing the feed).

Fig. 2

| Akagikougen 16 Up for adult chicken | | | | |
|---|---|---|---|---|
| Production date and year | April, Heisei 28 | Label | | |
| Name of feed | Kumiai Blend Feed | | | |
| | Akagikougen 16 Up for adult chicken | Names of raw materials and others | | |
| Feed type | Blend feed for raising adult chicken | Items of raw materials | Blend proportion | Names of raw materials |
| Name and address of producer | JA higashinihon kumiai shiryou K.K. 818 Higashisinmachi, Ohtashi, Gunma | Cereals<br>Vegetable oil cakes<br>Bran and residue<br>Animal-derived feed<br>Others | 54%<br>20%<br>12%<br>1%<br>13% | corn, polished white rice, cornstarch<br>soybean oil cake, rapeseed oil cake<br>corn distillers grain solubles, rice bran<br>fish meal<br>calcium carbonate, animal fat and oil, calcium phosphate, dietary salt, paprika extract, zeolite, Japanese mugwort powder, seaweeds, refined wood vinegar, silica anhydride, Bacillus subtilis, fermented plant powder, fermented milk powder |
| Name and address of production place | Kashima Factory, JA higashinihon kumiai shiryou K.K. 3 Higashifukasiba, Kamisushi, Ibaraki | | | |
| Target animal | Adult chicken (chicken after starting egg laying (excluding breeding hen)) | | | |
| Net weight | 15,000 kg | (Note) Names of raw materials are shown in descending order of the blend proportion in principle. | | |
| Amounts of ingredients | crude protein 16.0% or more<br>crude fat 3.0% or more<br>crude fiber 5.0% or less<br>crude ash 14.5% or less<br>calcium 2.80% or more<br>phosphorus 0.45% or more<br>in 1 kg of metabolic energy 2,830 Kcal or more | Notes | 1. This feed can be used only for those shown under "Target animal" above.<br>2. The animal fat and oil used in the raw materials for this feed are verified animal fat and oil (including those derived from ruminants).<br>Notes for usage and storage<br>1. Do not use this feed for cattle, ewe, goat, and deer (Be careful that use for cattle, ewe, goat, and deer will be subjected to punishment.).<br>2. Store this feed so as to avoid mixing of this feed with the feeds for cattle, ewe, goat, and deer (including raw materials and materials for producing the feed). | | |
| Names of feed additives contained | iron sulfate, copper sulfate, manganese sulfate, zinc carbonate, calcium iodate, vitamin A, vitamin D3, vitamin E, vitamin B1, vitamin B2, pantothenic acid, vitamin B12, nicotinic acid, folic acid, vitamin B6, biotin, vitamin K3, ethoxyquin, choline, phytase, methionine | | | |

Fig. 3

- Place of test: Akagiyama Farm, Takai Poultry Farm Y.K. (in Gunma prefecture)
- Breeds and the number of birds   Control zone: Julia, 33,412 birds
  test zone: Julia Light, 33,412 birds
- Test period: October 21, Heisei 27 to April 3, Heisei 28 (166 days)

- Aqueous solution containing acetylcysteine. Test using drinking water on hens for collecting eggs (basic data)
- Name of test product: Aqueous solution containing acetylcysteine
- Amount given: 3.3 l one time (diluted amount. 45 l)
- Frequency to give: Every 5 days
- Method of giving: Give acetylcysteine by mixing acetylcysteine with drinking water

| The number of times | Date of giving | Age in days (weeks) | Deaths and cullings (birds) Control zone | Deaths and cullings (birds) Test zone | The number of eggs laid (eggs) Control zone | The number of eggs laid (eggs) Test zone | Feed demand (g) Control zone | Feed demand (g) Test zone | Egg production rate (%) Control zone | Egg production rate (%) Test zone | Number egg weight (g) Control zone | Number egg weight (g) Test zone | Inner temperature of house (°C) Highest | Inner temperature of house (°C) Lowest |
|---|---|---|---|---|---|---|---|---|---|---|---|---|---|---|
| 1 | Oct. 21 | 316 | 6 | 5 | 30,550 | 30,952 | 113.4 | 112.3 | 91.4 | 92.5 | 64.8 | 63.2 | 23.5 | 19.0 |
| 2 | Oct. 26 | 321 | 52 | 31 | 152,530 | 153,470 | 116.6 | 110.4 | 92.0 | 92.3 | 64.9 | 63.2 | 24.0 | 18.5 |
| 3 | Oct. 31 | 326 | 33 | 39 | 152,033 | 154,131 | 116.7 | 110.2 | 91.3 | 92.4 | 64.6 | 63.3 | 22.0 | 19.5 |
| 4 | Nov. 5 | 331 | 44 | 28 | 151,843 | 153,390 | 115.4 | 111.5 | 91.2 | 92.1 | 65.0 | 63.7 | 25.0 | 20.0 |
| 5 | Nov. 10 | 336 (48) | 45 | 36 | 151,764 | 153,108 | 114.0 | 109.5 | 90.7 | 91.9 | 65.2 | 63.7 | 25.0 | 20.5 |
| 6 | Nov. 15 | 341 | 50 | 39 | 151,046 | 152,924 | 114.4 | 109.3 | 90.9 | 91.9 | 65.3 | 63.9 | 24.5 | 20.0 |
| 7 | Nov. 20 | 346 | 44 | 33 | 150,898 | 152,559 | 113.7 | 109.8 | 91.3 | 92.0 | 65.2 | 63.6 | 23.5 | 20.0 |
| 8 | Nov. 25 | 351 | 47 | 49 | 150,509 | 152,019 | 115.4 | 109.9 | 90.7 | 91.4 | 65.3 | 63.9 | 24.5 | 23.5 |
| 9 | Nov. 30 | 356 | 39 | 53 | 150,125 | 151,501 | 114.0 | 110.1 | 91.4 | 90.4 | 65.5 | 64.0 | 25.0 | 23.0 |
| 10 | Dec. 5 | 361 | 48 | 46 | 149,278 | 150,145 | 112.0 | 110.2 | 89.8 | 90.2 | 65.3 | 64.0 | 24.5 | 21.0 |
| 11 | Dec. 10 | 366 | 51 | 50 | 149,367 | 145,702 | 112.9 | 110.1 | 89.6 | 89.6 | 65.5 | 64.2 | 24.5 | 22.5 |
| 12 | Dec. 15 | 371 (53) | 44 | 45 | 149,059 | 149,180 | 115.7 | 108.1 | 90.4 | 89.9 | 65.4 | 64.3 | 24.5 | 22.5 |
| 13 | Dec. 20 | 376 | 58 | 58 | 148,267 | 148,368 | 117.4 | 110.4 | 89.7 | 88.6 | 66.2 | 64.3 | 24.5 | 21.5 |
| 14 | Dec. 25 | 381 | 53 | 54 | 147,731 | 148,393 | 113.7 | 109.4 | 88.5 | 89.7 | 65.9 | 64.5 | 24.5 | 22.5 |
| 15 | Dec. 30 | 386 | 39 | 39 | 143,129 | 150,632 | 116.3 | 109.3 | 89.4 | 89.1 | 66.0 | 64.4 | 24.0 | 21.0 |
| 16 | Jan. 4 | 391 | 43 | 63 | 145,168 | 146,705 | 113.9 | 109.1 | 85.0 | 89.4 | 66.0 | 64.8 | 25.0 | 22.0 |
| 17 | Jan. 9 | 396 | 49 | 46 | 146,678 | 147,554 | 114.7 | 109.0 | 90.9 | 89.4 | 66.0 | 64.9 | 24.5 | 22.5 |
| 18 | Jan. 14 | 401 | 46 | 48 | 146,927 | 146,254 | 114.9 | 107.6 | 91.0 | 90.1 | 66.3 | 65.0 | 24.5 | 21.5 |
| 19 | Jan. 19 | 406 (58) | 67 | 48 | 144,890 | 145,503 | 114.6 | 108.7 | 89.7 | 89.6 | 66.5 | 65.1 | 22.5 | 21.0 |
| 20 | Jan. 24 | 411 | 49 | 56 | 142,282 | 140,467 | 119.5 | 112.0 | 87.7 | 85.1 | 66.7 | 65.3 | 22.0 | 22.0 |
| 21 | Jan. 29 | 416 | 46 | 60 | 143,284 | 143,602 | 117.0 | 110.7 | 87.9 | 87.9 | 67.5 | 65.2 | 24.0 | 22.0 |
| 22 | Feb. 3 | 421 | 72 | 58 | 141,711 | 143,039 | 116.0 | 110.5 | 87.3 | 85.0 | 66.8 | 65.8 | 24.0 | 22.0 |
| 23 | Feb. 8 | 426 | 70 | 62 | 140,607 | 143,677 | 112.0 | 112.6 | 87.6 | 92.5 | 67.5 | 65.8 | 24.0 | 22.0 |
| 24 | Feb. 13 | 431 | 88 | 41 | 138,226 | 141,342 | 121.6 | 114.1 | 85.6 | 86.9 | 67.5 | 66.1 | 25.0 | 22.0 |
| 25 | Feb. 18 | 436 | 86 | 50 | 136,081 | 140,874 | 119.8 | 110.8 | 85.6 | 87.4 | 67.5 | 65.9 | 24.0 | 22.0 |
| 26 | Feb. 23 | 441 (63) | 89 | 65 | 135,837 | 139,608 | 117.9 | 110.6 | 82.3 | 86.3 | 67.4 | 66.1 | 25.0 | 22.5 |
| 27 | Feb. 28 | 446 | 90 | 74 | 135,432 | 139,086 | 120.7 | 112.1 | 84.5 | 86.1 | 67.6 | 66.0 | 24.5 | 23.0 |
| 28 | Mar. 4 | 451 | 115 | 69 | 133,708 | 136,701 | 115.6 | 110.9 | 83.2 | 85.0 | 67.3 | 66.0 | 25.0 | 23.5 |
| 29 | Mar. 9 | 456 | 128 | 74 | 131,256 | 138,688 | 115.8 | 111.0 | 84.4 | 89.1 | 67.3 | 65.9 | 25.0 | 23.5 |
| 30 | Mar. 14 | 461 | 115 | 95 | 130,076 | 135,773 | 113.6 | 110.6 | 81.7 | 80.3 | 67.1 | 66.1 | 24.0 | 23.0 |
| 31 | Mar. 19 | 466 | 110 | 57 | 129,106 | 136,049 | 112.7 | 109.4 | 81.4 | 84.5 | 67.5 | 66.4 | 23.5 | 22.0 |
| 32 | Mar. 24 | 471 | 133 | 59 | 128,589 | 132,997 | 112.9 | 109.1 | 80.3 | 83.1 | 67.5 | 65.9 | 24.5 | 23.0 |
| 33 | Mar. 29 | 476 (68 weeks) | 81 | 68 | 127,718 | 133,230 | 114.5 | 108.9 | 82.8 | 82.8 | 67.4 | 65.7 | 25.0 | 22.5 |
| 34 | Apr. 3 | 481 | 125 | 106 | 125,258 | 132,225 | 115.8 | 111.1 | 80.5 | 83.4 | 67.3 | 65.8 | 25.0 | 22.0 |
| Total | 34 times | 166 days | 2,255 | 1,804 | 4,731,063 | 4,809,848 | 3,925.1 | 3,750.3 | 2,977.5 | 3,010.9 | 2,254.8 | 2,206.0 | | |
| | | | Difference in deaths | −451 | Difference in the number of eggs laid | △78,785 | 115.44 | 110.30 | 87.57 | 88.56 | 66.32 | 64.88 | 24.3 | 21.7 |
| Comparison | | | 100% | 80% | 100% | 101.67% | 100% | 95.55% | 100% | 101.12% | 100% | 97.84% | | |

CP17 Feed was changed on Feb. 15
CP16

Fig. 4

Aqueous solution containing acetylcysteine, Test using drinking water on hens for collecting eggs (basic data)
- Place of test: Akagiyama Farm, Takai Poultry Farm Y.K. (in Gunma prefecture)
- Breeds and the number of birds    Control zone: Julia, 33,412 birds
  test zone: Julia Light, 33,412 birds
- Test period: October 1 to October 20, Heisei 27 (20 days)

20 days before start of test

| The number of times | Date of giving | Age in days (weeks) | Deaths and cullings (birds) | | The number of eggs laid | | Feed demand (g) | | Egg production rate (%) | | Number egg weight (g) | |
|---|---|---|---|---|---|---|---|---|---|---|---|---|
| | | | Control zone | Test zone | Control zone | Test zone | Control zone | Test zone | Control zone | Test zone | Control zone | Test zone |
| | Oct. 1 | 296 | 4 | 6 | 30,827 | 30,758 | 109.5 | 111.0 | 91.7 | 91.5 | | |
| | Oct. 2 | 297 | 11 | 12 | 30,908 | 30,055 | 111.4 | 109.5 | 92.0 | 89.5 | 64.2 | 62.5 |
| | Oct. 3 | 298 | 3 | 3 | 30,458 | 30,971 | 112.6 | 111.0 | 90.7 | 92.2 | | |
| | Oct. 4 | 299 | 6 | 7 | 30,820 | 30,715 | 112.0 | 110.7 | 91.8 | 91.4 | | |
| | Oct. 5 | 300 | 14 | 10 | 30,650 | 30,735 | 110.2 | 108.6 | 91.3 | 91.5 | | |
| | Oct. 6 | 301 | 14 | 12 | 30,772 | 30,955 | 113.3 | 110.2 | 91.7 | 92.2 | | |
| | Oct. 7 | 302 | 8 | 10 | 30,599 | 30,751 | 111.3 | 109.7 | 91.3 | 91.6 | 64.2 | 62.9 |
| | Oct. 8 | 303 | 6 | 12 | 30,920 | 30,596 | 110.9 | 110.3 | 92.2 | 91.2 | | |
| | Oct. 9 | 304 | 8 | 3 | 30,720 | 30,972 | 111.0 | 109.7 | 91.6 | 92.3 | | |
| | Oct. 10 | 305 | 12 | 7 | 30,708 | 30,962 | 110.1 | 110.3 | 91.6 | 92.3 | | |
| | Oct. 11 | 306 | 7 | 5 | 30,682 | 30,799 | 109.6 | 110.1 | 91.6 | 91.8 | | |
| | Oct. 12 | 307 | 9 | 4 | 30,844 | 30,949 | 111.1 | 114.0 | 92.1 | 92.3 | 64.3 | 63 |
| | Oct. 13 | 308 | 8 | 6 | 30,750 | 30,586 | 112.0 | 112.5 | 91.8 | 91.2 | | |
| | Oct. 14 | 309 | 7 | 4 | 30,562 | 30,765 | 112.9 | 111.9 | 91.3 | 91.8 | | |
| | Oct. 15 | 310 | 6 | 5 | 30,673 | 30,973 | 111.4 | 112.5 | 91.6 | 92.4 | | |
| | Oct. 16 | 311 | 12 | 7 | 30,836 | 30,860 | 114.2 | 110.4 | 92.1 | 92.1 | | |
| | Oct. 17 | 312 | 11 | 10 | 30,645 | 30,758 | 109.5 | 110.0 | 91.6 | 91.8 | 64.7 | 63 |
| | Oct. 18 | 313 | 5 | 5 | 30,676 | 31,302 | 114.9 | 108.1 | 91.8 | 93.5 | | |
| | Oct. 19 | 314 | 13 | 8 | 30,718 | 30,661 | 114.5 | 111.7 | 91.9 | 91.6 | | |
| | Oct. 20 | 315 | 3 | 7 | 30,619 | 30,586 | 114.0 | 109.6 | 91.6 | 91.4 | | |
| | Total | | 167 | 143 | 614,387 | 615,709 | 111.82 | 110.60 | 91.67 | 91.800 | 64.35 | 62.85 |
| | | | | | | | | 98.91% | | 100.15% | | 97.67% |
| | | | | Feed conversion rate | | | 1.89 | 1.92 | | | | |
| | | | | | | | | 101.59% | | | | |

Aqueous solution containing acetylcysteine. Test using drinking water on hens for collecting eggs (Aggregation of results)

- Place of test: Akagiyama Farm, Takai Poultry Farm Y.K. (in Gunma prefecture)
- Test period: October 21, Heisei 27 to February 28, Heisei 28 (166 days)
- Breeds and the number of birds   Control zone: Julia, 33,412 birds  Test zone: Julia Light, 33,412 birds ■ Comparison to results of tests performed in experimental laboratories of prefectures (the number of test birds used in each prefecture: 100 birds)

| Egg production rate (%) | Control zone Julia | Test zone Light | Proportion |
|---|---|---|---|
| Acetylcysteine | 87.6 | 88.6 | 101.14% |
| 20 days before start of test | 91.7 | 91.8 | 100.11% |
| Tokushima prefecture | 95.8 | 94.2 | 98.33% |
| Kanagawa prefecture 20 | 89.7 | 88.6 | 98.77% |
| Kanagawa prefecture 21 | 90.3 | 91.9 | 101.77% |
| Gunma prefecture | 94.2 | 93.1 | 98.83% |

*A higher numeric value is better.

| Average egg weight (g) | Control zone Julia | Test zone Light | Proportion |
|---|---|---|---|
| Acetylcysteine | 66.3 | 64.9 | 97.89% |
| 20 days before start of test | 64.4 | 62.9 | 97.67% |
| Tokushima prefecture | 65.4 | 63.9 | 97.71% |
| Kanagawa prefecture 20 | 62.2 | 60.4 | 97.11% |
| Kanagawa prefecture 21 | 62.6 | 61.2 | 97.76% |
| Gunma prefecture | 65.7 | 62.2 | 94.67% |

*A greater numeric value is better.

| Feed intake (g) | Control zone Julia | Test zone Light | Proportion |
|---|---|---|---|
| Acetylcysteine | 115.4 | 110.3 | 95.58% |
| 20 days before start of test | 111.8 | 110.6 | 98.93% |
| Tokushima prefecture | 121.7 | 120.6 | 99.10% |
| Kanagawa prefecture 20 | 110.9 | 109.3 | 98.56% |
| Kanagawa prefecture 21 | 112.7 | 114.4 | 101.51% |
| Gunma prefecture | 4,118 kg | 3,913 kg | 95.02% |

*Needs the balance with the egg production rate and the egg weight although a smaller numeric value is better.

| Feed conversion rate | Control zone Julia | Test zone Light | Proportion |
|---|---|---|---|
| Acetylcysteine | 1.99 | 1.92 | 96.48% |
| 20 days before start of test | 1.89 | 1.92 | 101.59% |
| Tokushima prefecture | 1.94 | 1.96 | 101.03% |
| Kanagawa prefecture 20 | 1.99 | 2.05 | 103.01% |
| Kanagawa prefecture 21 | 2.00 | 2.04 | 102.00% |
| Gunma prefecture | 1.81 | 1.83 | 101.10% |

*Although a smaller numeric value increases economic efficiency, an excessively small value deteriorates it.

| The number of deaths and cullings (birds) | Total of deaths and cullings | | Difference between control zone and test zone | Proportion of test zone to control zone |
|---|---|---|---|---|
| | Control zone Julia | Test zone Light | | |
| Acetylcysteine | 2,255 | 1,804 | -451 | 80.00% |
| 20 days before start of test | 167 | 143 | -24 | 85.63% |
| Kanagawa prefecture 20 | 18.7% | 18.7% | 0 | 100.00% |
| Kanagawa prefecture 21 | 9.3% | 9.4% | 0.1% | 101.07% |
| Gunma prefecture | 0 | 1 | 1 | 101.01% |

*A smaller value is better.

| The number of eggs laid (eggs) | Control zone Julia | Test zone Light | Proportion |
|---|---|---|---|
| acetylcysteine | 4,731,063 | 4,809,848 | 101.67% |
| 20 days before start of test | 614,387 | 615,375 | 100.16% |
| Gunma prefecture | 33,244 | 32,896 | 98.95% |

*The number of birds on the first day was prorated because the number thereof in the test zone was larger than that in the control zone.

Fig. 8

Blend proportion and composition of ingredients in basic feed (%)

| Raw materials | Blend proportion | Raw materials | Blend proportion |
|---|---|---|---|
| flaked corn | 49.49 | calcium carbonate | 8.25 |
| grain sorghum | 6.86 | dietary salt | 0.30 |
| soybean residue | 25.50 | vitamins B premix[1] | 0.10 |
| degreased rice bran | 4.00 | vitamins A, D, E premix[2] | 0.10 |
| fish meal (CP60%) | 1.00 | subtle mineral premix[3] | 0.10 |
| DL-methionine | 0.20 | vitamin $K_3$[4] | 0.01 |
| animal fat and oil | 2.85 | choline chloride[5] | 0.02 |
| calcium tertiary phosphate | 1.22 | | |
| Total | | | 100.00 |
| Composition of ingredients (%)[6] | | | |
| crude protein | 17.33 | calcium | 3.73 |
| metabolic energy (Mcal/kg) | 2.80 | phosphorus | 0.57 |

Note 1) In 1 kg: thiamin mononitrate 2.0 g, riboflavin 10.0 g, pyridoxine hydrochloride 2.0 g, nicotinic acid amido 2.0 g, calcium D-pantothenate 4.35 g, choline chloride 138.0 g, folic acid 1.0 g, cyanocobalamine 10 mg 2) In 1 kg: vitamin A oil 10,000 IU, vitamin D3 oil 2,000 IU, dl-α-tocopherol acetate 20 mg 3) In 1 kg: manganese 80 g, zinc 50 g, iron 6 g, iodine 1 g, copper 0.6 g 4) 5% formulation 5) 60% formulation 6) Calculated value according to Standard Tables of Feed Composition in Japan (2009 edition)

Fig. 9

| Average weight (g/bird) | | Control zone | Standard zone | 5-fold zone | Index |
|---|---|---|---|---|---|
| At start (difference from index) | Weight | 1,617 | 1,567 | 1,581 | 1,730 |
| | Difference | -113 | -163 | -149 | |
| At end (42 days) (difference from start) | Weight | 1,719 | 1,728 | 1,718 | 1,745 |
| | Increase (g) | 102 | 161 | 137 | 15 |
| | Per day | 2.4 g | 3.8 g | 3.2 g | |
| | Comparison (%) | 100% | 158% | 134% | |

Fig. 10

Test of improvement of feed conversion rate by acetylcysteine
- Test period: Preliminary test: September 21 to October 5, Heisei 28
  Age in days 281-day old (40-week old) to 295-day old (42-week old)
  Main test: October 6 to November 2, Heisei 28
  Age in days 296-day old (42-week old) to 323-day old (46-week old)

- Tested by: Japan Scientific Feeds Association
- Tested breed: Julia Light
- Method of giving: Give acetylcysteine by mixing acetylcysteine with the feed
- Amount given: Standard zone 0.0014% (1 mg/kg), 5-fold zone, 0.007%
- The number of tested birds: Standard zone 40 birds, 5-fold zone 40 birds, control zone 40 birds (1 bird/cage)

Test in chicken farm
- Place of test: In Gunma prefecture
- Test period: October 21, Heisei 27 to April 3, Heisei 28 (166 days, 24 weeks)
- Method of giving: Give acetylcysteine by mixing acetylcysteine with drinking water
- Amount given: 1 mg/kg
- Breeds and the number of birds (at the start):
  Control zone: Julia    33,412 birds (5 birds/cage)
  Test zone: Julia Light  33,412 birds (5 birds/cage)
- Age in days: Preliminary test   Age in days 296-day old (42-week old) to 315-day old (45-week old)
  Main test                        Age in days 316-day old (46-week old) to 481-day old (69-week old)

1. Results of test
- Feed intake (g/bird)

| | | 40-week old Preliminary Week 1 | 41-week old Preliminary Week 2 | Preliminary test Average | 42-week old Week 1 | 43-week old Week 2 | 44-week old Week 3 | 45-week old Week 4 | Main test Average |
|---|---|---|---|---|---|---|---|---|---|
| Japan Scientific Feeds Association | Control zone 4 weeks (Light) | 113.2 | 116.2 | 114.7 | 115.0 | 115.3 | 115.7 | 117.0 | 115.7 |
| | Test zone Standard zone 4 weeks (Light) | 118.5 | 120.7 | 119.6 | 118.3 | 118.0 | 119.6 | 118.3 | 118.5 |
| | 5-fold zone 4 weeks (Light) | 117.9 | 117.3 | 117.6 | 116.2 | 115.8 | 118.9 | 122.0 | 118.2 |
| Ordinary management in chicken farm | Control zone 4 weeks (Julia) | 111.23 | 112.41 | 111.82 | 114.26 | 116.5 | 115.39 | 112.7 | 114.71 |
| | 24 weeks (Julia) | | | | | | | | 115.40 |
| | Test zone 4 weeks (Light) | 110.10 | 111.08 | 110.59 | 111.20 | 110.07 | 110.60 | 109.60 | 110.37 |
| | 24 weeks (Light) | | | | | | | | 110.30 |

- Egg production rate (%)

| | | 40-week old Preliminary Week 1 | 41-week old Preliminary Week 2 | Preliminary test Average | 42-week old Week 1 | 43-week old Week 2 | 44-week old Week 3 | 45-week old Week 4 | Main test Average |
|---|---|---|---|---|---|---|---|---|---|
| Japan Scientific Feeds Association | Control zone 4 weeks (Light) | 96.5 | 98.6 | 97.5 | 98.6 | 97.9 | 100.0 | 99.0 | 98.5 |
| | Test zone standard zone 4 weeks (Light) | 95.4 | 98.9 | 97.2 | 98.9 | 98.6 | 99.7 | 99.7 | 99.2 |
| | 5-fold zone 4 weeks (Light) | 95.9 | 98.5 | 97.2 | 97.6 | 98.0 | 98.9 | 100.0 | 98.6 |
| Ordinary management in chicken farm | Control zone 4 weeks (Julia) | 91.59 | 91.74 | 91.67 | 81.33 | 91.2 | 81.2 | 80.9 | 81.18 |
| | 24 weeks (Julia) | | | | | | | | 87.60 |
| | Test zone 4 weeks (Light) | 91.60 | 91.99 | 91.80 | 91.94 | 92.23 | 91.76 | 91.80 | 91.93 |
| | 24 weeks (Light) | | | | | | | | 88.69 |

- Egg weight (g)

| | | 40-week old Preliminary Week 1 | 41-week old Preliminary Week 2 | Preliminary test Average | 42-week old Week 1 | 43-week old Week 2 | 44-week old Week 3 | 45-week old Week 4 | Main test Average |
|---|---|---|---|---|---|---|---|---|---|
| Japan Scientific Feeds Association | Control zone 4 weeks (Light) | 61.9 | 64.1 | 63.0 | 65.3 | 65.4 | 65.2 | 65.2 | 65.3 |
| | Test zone Standard zone 4 weeks (Light) | 61.8 | 63.6 | 62.7 | 65.2 | 65.2 | 65.1 | 64.9 | 65.1 |
| | 5-fold zone 4 weeks (Light) | 58.2 | 61.9 | 60.1 | 62.4 | 63.4 | 64.0 | 64.3 | 63.5 |
| Ordinary management in chicken farm | Control zone 4 weeks (Julia) | 64.2 | 64.50 | 64.35 | 64.85 | 64.6 | 65.1 | 65.3 | 64.96 |
| | 24 weeks (Julia) | | | | | | | | 66.30 |
| | Test zone 4 weeks (Light) | 62.70 | 63.00 | 62.85 | 63.20 | 63.3 | 63.7 | 63.90 | 63.53 |
| | 24 weeks (Light) | | | | | | | | 64.90 |

- Feed conversion rate

| | | 40-week old Preliminary Week 1 | 41-week old Preliminary Week 2 | Preliminary test Average | 42-week old Week 1 | 43-week old Week 2 | 44-week old Week 3 | 45-week old Week 4 | Main test Average |
|---|---|---|---|---|---|---|---|---|---|
| Japan Scientific Feeds Association | Control zone 4 weeks (Light) | 1.87 | 1.81 | 1.84 | 1.79 | 1.81 | 1.78 | 1.82 | 1.80 |
| | Test zone Standard zone 4 weeks (Light) | 2.01 | 1.92 | 1.97 | 1.84 | 1.84 | 1.85 | 1.83 | 1.84 |
| | 5-fold zone 4 weeks (Light) | 2.03 | 1.90 | 1.97 | 1.86 | 1.83 | 1.86 | 1.90 | 1.86 |
| Ordinary management in chicken farm | Control zone 4 weeks (Julia) | 1.89 | 1.89 | 1.89 | 1.93 | 1.98 | 1.94 | 1.90 | 1.94 |
| | 24 weeks (Julia) | | | | | | | | 1.99 |
| | Test zone 4 weeks (Light) | 1.92 | 1.92 | 1.92 | 1.91 | 1.89 | 1.89 | 1.87 | 1.89 |
| | 24 weeks (Light) | | | | | | | | 1.92 |

2. Aggregation of results of test

■ Feed intake (g/bird)

| | | | Preliminary test average | Main test average | Difference between preliminary test and main test | Difference between control zone and test zone |
|---|---|---|---|---|---|---|
| Japan Scientific Feeds Association | Control zone | 4 weeks (Light) | 114.7 | 115.7 | 1.0 | |
| | Test zone | Standard zone 4 weeks (Light) | 119.6 | 118.5 | -1.1 | 2.1 |
| | | 5-fold zone 4 weeks (Light) | 117.6 | 118.2 | 0.6 | 0.4 |
| Ordinary management in chicken farm | Control zone | 4 weeks (Julia) | 111.82 | 114.71 | 2.89 | |
| | | 24 weeks (Julia) | | 115.40 | 3.58 | |
| | Test zone | 4 weeks (Light) | 110.59 | 110.37 | -0.22 | 3.11 |
| | | 24 weeks (Light) | | 110.30 | -0.29 | 3.87 |

■ Egg production rate (%)

| | | | Preliminary test average | Main test average | Difference between preliminary test and main test | Difference between control zone and test zone |
|---|---|---|---|---|---|---|
| Japan Scientific Feeds Association | Control zone | 4 weeks (Light) | 97.5 | 98.5 | 1.0 | |
| | Test zone | Standard zone 4 weeks (Light) | 97.2 | 99.2 | 2.0 | 1.0 |
| | | 5-fold zone 4 weeks (Light) | 97.2 | 98.6 | 1.4 | 0.4 |
| Ordinary management in chicken farm | Control zone | 4 weeks (Julia) | 91.67 | 91.16 | -0.51 | |
| | | 24 weeks (Julia) | | 87.60 | -4.07 | |
| | Test zone | 4 weeks (Light) | 91.80 | 91.93 | 0.13 | 0.64 |
| | | 24 weeks (Light) | | 88.60 | -3.20 | 0.87 |

■ Egg weight (g)

| | | | Preliminary test average | Main test average | Difference between preliminary test and main test | Difference between control zone and test zone |
|---|---|---|---|---|---|---|
| Japan Scientific Feeds Association | Control zone | 4 weeks (Light) | 63.0 | 65.3 | 2.3 | |
| | Test zone | Standard zone 4 weeks (Light) | 62.7 | 65.1 | 2.4 | 0.1 |
| | | 5-fold zone4 weeks (Light) | 60.1 | 63.5 | 3.4 | 1.1 |
| Ordinary management in chicken farm | Control zone | 4 weeks (Julia) | 64.35 | 64.96 | 0.61 | |
| | | 24 weeks (Julia) | | 66.30 | 1.95 | |
| | Test zone | 4 weeks (Light) | 62.85 | 63.53 | 0.68 | 0.07 |
| | | 24 weeks (Light) | | 64.90 | 2.05 | 0.10 |

■ Comparison of feed conversion rate in main test to that in preliminary test

| | | | Preliminary test Week 2 average | Main test average | Difference between preliminary test and main test | | Improvement rate | |
|---|---|---|---|---|---|---|---|---|
| | | | | | Numeric value | Rate | Rate | Comparison total |
| Japan Scientific Feeds Association | Control zone | 4 weeks (Light) | 1.84 | 1.80 | -0.04 | 97.83% | 2.17% | |
| | Test zone | Standard zone 4 weeks (Light) | 1.97 | 1.84 | -0.13 | 93.40% | 6.60% | 4.43% |
| | | 5-fold zone 4 weeks (Light) | 1.97 | 1.86 | -0.11 | 94.42% | 5.58% | 3.41% |
| Ordinary management in chicken farm | Control zone | 4 weeks (Julia) | 1.89 | 1.94 | 0.05 | 102.65% | -2.65% | |
| | | 24 weeks (Julia) | | 1.99 | 0.10 | 105.29% | -5.29% | |
| | Test zone | 4 weeks (Light) | 1.92 | 1.89 | -0.03 | 98.44% | 1.56% | 4.21% |
| | | 24 weeks (Light) | | 1.92 | 0 | 100.00% | 0.00% | 5.29% |

| Blend proportion (%) of basic feed | | |
|---|---|---|
| Raw materials | For first period of raising[1] | For second period of raising[1] |
| flaked corn | 58.99 | 71.93 |
| grain sorghum | 5.00 | 5.00 |
| soybean residue | 25.10 | 15.78 |
| corn gluten meal | 5.00 | 3.00 |
| L-lysine hydrochloride | 0.28 | 0.37 |
| DL-methionine | 0.25 | 0.18 |
| L-threonine | 0.04 | 0.14 |
| L-tryptophan | 0.01 | 0.02 |
| L-arginine | 0.08 | 0.23 |
| animal fat and oil | 2.34 | 0.10 |
| calcium tertiary phosphate | 1.65 | 0.65 |
| calcium carbonate | 0.71 | 1.50 |
| dietary salt | 0.30 | 0.65 |
| choline chloride (60% formulation) | 0.05 | 0.25 |
| vitamin and mineral premix[2] | 0.20 | 0.20 |
| Total | 100.00 | 100.00 |

Notes 1) For first period of raising: Feeding to the end of Week 3, For second period of raising: Week 4 to end of Week 7
2) In 1 kg: thiamin mononitrate 2 g, riboflavin 4.5 g, pyridoxine hydrochloride 2 g, cyanocobalamine 10 mg, nicotinic acid 30 g, D-pantothenic acid calcium 7.5 g, d-biotin 75 mg, folic acid 1 g, vitamin A 6,500,000 IU, vitamin D3 2,500, 000 IU, dl-α-tocopherol acetate 40 g, vitamin K3 3.836 g, manganese 50 g, zinc 50 g, iron 20 g, copper 7.5 g, iodine 0.5 g

Fig. 13

Amount of test product added

| Age in days | Average weight (g/bird) | Amount of test substance given (mg/bird) | Average feed intake (g/day/bird) | Concentration in feed (%) |
|---|---|---|---|---|
| 1 - 7 | 107 | 0.107 | 24 | 0.0005 |
| 8 - 14 | 323 | 0.323 | 53 | 0.0007 |
| 15 - 21 | 694 | 0.694 | 92 | 0.0008 |
| 22 - 28 | 1208 | 1.208 | 134 | 0.0010 |
| 29 - 35 | 1819 | 1.819 | 172 | 0.0011 |
| 36 - 42 | 2477 | 2.477 | 203 | 0.0013 |
| 43 - 49 | 3136 | 3.136 | 225 | 0.0014 |

Fig. 14

AGENT FOR IMPROVING FEED CONVERSION RATE, AGENT FOR IMPROVING SURVIVAL RATE, AGENT FOR IMPROVING THE NUMBER OF EGGS LAID BY EGG-LAYING HEN, AND METHOD OF GIVING SAME TO ANIMALS, AND FEED

TECHNICAL FIELD

The present invention relates to an agent for improving a feed conversion rate, an agent for improving a survival rate, an agent for improving the number of eggs laid by an egg-laying hen, and a method of giving these agents to animals, and a feed.

BACKGROUND ART

In livestock farms where animals such as cattle, pigs, sheep, horses, and chickens are raised by giving feeds, one of keys to improve the profitability is to increase the feed conversion rate, the survival rate, and the number of eggs laid by an egg-laying hen. The feed conversion rate indicates the weight of a feed required for a target individual animal to be raised to gain a predetermined weight. A lower feed conversion rate results in higher profitability. The feed conversion rate of the egg-laying hen is represented by the ratio of the total weight of eggs laid to the amount of feed given.

The proportion of the feed cost in the total expense is the highest in chickens among a variety of animals raised in livestock farms; the feed cost of the egg-laying hen occupies about 60% of the total expense and that of broilers occupies about 70% thereof. Accordingly, an increase in feed conversion rate is particularly important in the raising of chickens to improve the profitability.

Conventionally, to promote the growth of target animals to be raised or maintain the health thereof in livestock farms, a variety of additives are added to feeds, and additives containing L-cysteine and N-acetylcysteine are proposed in the related art (see Patent Literature 1, for example).

L-cysteine feeds SH groups to SH enzyme inside the body, and promotes the metabolism of three major nutrients (sugar, protein, and lipid) taken into the body to convert the nutrients into energy. L-cysteine also activates the detoxification reaction and dermal metabolism in the body to assist the maintenance of biological functions. On the other hand, N-acetylcysteine increases the amount of glutathione in the body to neutralize reactive oxygen species and assist prevention of aging of the living body. N-acetylcysteine also assists the discharge of heavy metals such as lead, cadmium, and mercury to the outside of the body and the prevention of respiratory disorders such as bronchitis and asthma.

CITATION LIST

Patent Literature

Patent Literature 1: International Publication No. WO 2005/035477

SUMMARY OF INVENTION

Technical Problem

Unfortunately, the additives for animal feeds according to Patent Literature 1 are not intended to increase the feed conversion rate of the target animal to be raised, and have difficulties in directly and significantly improving the profitability of the livestock farm.

The present invention has been made in consideration of such circumstances. An object of the present invention is to provide an agent for improving a feed conversion rate, an agent for improving a survival rate, an agent for improving the number of eggs laid by an egg-laying hen, a method of giving these agents to animals, and a feed which can directly and significantly improve the profitability of livestock farms.

Solution to Problem

To solve the problem described above, the agent for improving a feed conversion rate, the agent for improving a survival rate, and the agent for improving the number of eggs laid by an egg-laying hen according to the present invention are characterized to comprise at least one effective ingredient selected from cysteine and cysteine derivatives.

To solve the problem described above, the method of giving the agent for improving a feed conversion rate, the agent for improving a survival rate, and the agent for improving the number of eggs laid by an egg-laying hen according to the present invention is characterized to comprise giving animals an aqueous solution of at least one effective ingredient selected from cysteine and cysteine derivatives as drinking water or a feed sprayed with the aqueous solution, or giving a feed containing the effective ingredient added thereto in the powdery form to animals.

To solve the problem described above, the feed according to the present invention is characterized to comprise at least one effective ingredient selected from cysteine and cysteine derivatives added thereto. The effective ingredient may be added to a feed by a method of spraying an aqueous solution of the effective ingredient to the feed with a spray or a method of mixing the effective ingredient in the powdery form with the feed.

The development of the present invention will now be described.

The population in the world at present exceeds seven billion, and is expected to reach nine billion in 2050. In foods, the amount of meat consumption has been increasing in developing countries in particular, and the world-wide production of chicken meat having high feed efficiency has been increasing. It is considered that this is related with health consciousness and religion. Although the production of feed crops has been increasing with an increased demand for meat, the demand for meat outpaces the production of feed crops. It is said that scrambles for feed may happen if the demand for meat is increasing as it is.

Looking at Japan, the infection of highly pathogenic avian influenza in domestic chicken farms was recognized in Heisei 16 after an interval of 79 years. Since then, the chicken industry has been exposed to a threat which shakes their management itself, causing enormous psychological loads on the managers and people involved. Furthermore, the cost of prevention measures against diseases has been increasing, and it is believed that such a situation will continue in the future. In addition, the management of the farm largely depends on the feed cost, which occupies about 60% to 70% of the expense. To address the difficulties in the management, an increase in income in ordinary times and thus the stabilization and improvement of the management are required. What is considered primary to satisfy this requirement is an improvement in productivity (proportion of the growth rate to the feed conversion rate). An improvement in productivity is an essential problem.

On the other hand, an idea "animal welfare" about raising livestock has been introduced mainly in Europe and the United States. In Japan, it is defined as "raising and management of livestock in consideration of its amenity." Laws and regulations are enacted in EU, Britain, and Switzerland. Guidelines are formulated by the government in cooperation with the industrial organizations in Canada and Australia. The Ministry of Agriculture, Forestry and Fisheries of Japan also publishes the "guidelines on raising and management."

Although only an increase in cost is apt to be focused in animal welfare due to the necessity of an improvement in the raising environment, the guidelines mention that "the most important things to address animal welfare are not the structure of the facility or the situation of the equipment, rather keeping livestock healthy through daily observation and recording of the livestock, handling of the livestock with care, and appropriate raising and management such as high quality feed and watering. People involved should sufficiently understand and promote those." The guidelines also point out that animal welfare results in an improved productivity.

The idea of animal welfare originated from Britain, and proposes a raising and management method allowing animals to live healthy lives. The most serious problem against the idea of animal welfare is raising of egg-laying hens in cages. While foreign countries have already been taking specific actions for animal welfare, Japan is left behind. Europe is the most advanced region, and it is reported that about 80% of egg producers in the United States participate in the guidelines. Furthermore, although a survey in 2009 reports that 95% of the egg-laying hens in the United States are raised in cages, United Egg Producers and Humane Society of the United States reached a 2011 historic agreement that "the conventional raising of chickens in cages is prohibited in years to come."

Chicken farming in Japan has developed following that in the United States, and is expected to be influenced by the movement in that in the United States. Accordingly, it is believed that it is inevitable to keep up with animal welfare. The aim of animal welfare is the health of animals. Japanese animal welfare should be practiced in a manner unique to and suitable for the situation where 98.7% of chicken is raised in cages according to a survey in 2009.

Furthermore, feeding of antibiotics to improve the feed conversion rate and promote the growth may lead to the emergence of drug-resistant bacteria. For this reason, raising without feeding antibiotics has been the world-wide trend, and a feed additive in place of antibiotics is required. The action to enhance immunity is essential to replace the antibiotics.

The present inventor has pay attention to oxidative stress which causes a wide range of health damage. The term "oxidative stress" indicates that "the oxidation reaction by reactive oxygen species exceeds the antioxidative action in the body, exerting hazardous action over cells."

While it is a well-known fact that the poultry (egg-laying hens and chickens for meat) in Japanese chicken farms are raised with a high density, it has to be said that such a situation is difficult due to the management efficiency to improve for a short time. If the stress always applied to the poultry due to high-density raising is difficult to reduce, the present inventor came to an idea that by controlling the reactive oxygen species generated to response to the stress, the oxidative stress is reduced to decrease adverse effects attributed to the reactive oxygen species and to maintain and improve the health condition, and this serves the purpose of animal welfare.

The reactive oxygen species are originally generated to protect the body, and an appropriate amount thereof is good for the body; however, an excess amount thereof is hazardous. In other words, if the reactive oxygen species beyond the antioxidative capacity that the body has are generated, the reactive oxygen species that cannot be treated react with a variety of biogenic components to cause adverse effects. It is said that excess reactive oxygen species generated when a variety of stresses are felt are involved in 90% or more of human lifestyle-related diseases, and food products containing antioxidative substances are often popular. The same applies to the health condition of livestock animals, and it is clear that the health condition is significantly affected by the oxidative stress.

In Japan, the antioxidative substances have been examined in the measures against heat stress of poultry. However, it appears that the measures against stress through the raising period thereof are barely examined. A variety of antioxidative substances then have been examined in order to enhance the antioxidative capacity by taking the antioxidative substances, to maintain the health by removing the excess reactive oxygen species generated under stress, and to improve the productivity (feed conversion rate and growth rate) of the poultry. As the result of the examination, acetylcysteine (N-acetyl-L-cysteine) was selected as the most suitable substance for the following reasons: it has high antioxidative potential and is barely oxidized in the stomach. A large amount thereof is delivered to the liver. It has high safety and is proven.

Acetylcysteine is a health supplement for enhancing the productivity (feed conversion rate and growth rate) by enhancing the stress response capacity inside the body of an animal, rather than by reducing stress by improving the raising environment such as the facility and management demanded by the guidelines of animal welfare. Furthermore, acetylcysteine is known as a precursor substance of glutathione, which is an important antioxidative substance biosynthesized inside the body. It is well known that glutathione enhances the immunity of animals.

Accordingly, this is also considered as one of ideas of Japanese animal welfare if giving acetylcysteine to animals avoids the deterioration in animal health. Furthermore, acetylcysteine can replace antibiotics if an improvement in feed conversion rate and the promotion of growth are verified.

Acetylcysteine is a derivative (a compound modified to an extent that the characteristics of the matrix are not significantly changed) of cysteine, and is an amino acid prepared through acetylation of cysteine to have high antioxidative potential. Acetylcysteine is patented in 1960. The production and distribution of an antitussive drug "Mucofilin," which is still commercially available, were approved in 1965. Since then, acetylcysteine has been used in many applications such as a detoxificant over half a century. Acetylcysteine is one of essential pharmaceuticals in the World Health Organization (WHO), and is one of the most important pharmaceuticals indispensable to the basic insurance system. Acetylcysteine is also used as detoxificants, antitussive drugs, and infusion solutions in Japan, and a variety of applications to influenza, chronic bronchitis, auditory disturbance, lower back pain, and mental disorder are currently examined.

In particular, acetylcysteine is a major antioxidative material and is established as a proven material having verified safety in the U.S. health food product market where health supplements for dogs and cats are also commercially available. These are also called anti-aging supplements thereof, and are imported into and distributed in Japan. In Japan, however, acetylcysteine is listed in the "list of raw materials exclusively used as pharmaceuticals." The list shows that production and distribution of acetylcysteine only as a pharmaceutical raw material are approved while the production thereof as food products and a food product additive is not approved. Eye-drops thereof for animals are approved and distributed in Japan.

For side effects of acetylcysteine, it is considered that intake of acetylcysteine during pregnancy is safe. Although acetylcysteine is safe to most of people, there are rare cases where side effects such as nausea, diarrhea, and constipation may cause.

Advantageous Effects of Invention

The agent for improving a feed conversion rate, the agent for improving a survival rate, the agent for improving the number of eggs laid by an egg-laying hen, the method of giving these agents to animals, and a feed according to the present invention can improve the feed conversion rate of the target animal to be raised, and improve the productivity of livestock farms.

BRIEF DESCRIPTION OF DRAWINGS

FIG. 1 is a table illustrating a blend of a first feed given to egg-laying hens in a first test.

FIG. 2 is a table illustrating a blend of a second feed given to egg-laying hens in the first test.

FIG. 3 is a table illustrating the test data of the first test.

FIG. 4 is a table illustrating the test data of a preparative test performed prior to the first test.

FIG. 5 is a table illustrating the comparison between the test data of the first test and the test data of comparative tests performed in experimental laboratories of prefectures.

FIG. 7 is a table illustrating the comparison among the test data of the first test, the test data of the preparative test performed prior to the first test, and the test data of the comparative tests performed in the experimental laboratories of the prefectures.

FIG. 8 is a table illustrating a blend of a basic feed given to egg-laying hens in a second test.

FIG. 9 is a table illustrating the average weight of tested hens at the start of the second test and the average weight of the tested hens at the end of the test.

FIG. 10 is a table illustrating the data obtained in the second test, i.e., the feed intake, the egg production rate, the egg weight, and the feed conversion rate (data from Japan Scientific Feeds Association) and the data obtained in a test performed in a chicken farm under the same condition as that of the second test, i.e., the feed intake, the egg production rate, the egg weight, and the feed conversion rate (standard management data in a chicken farm).

FIG. 11 is a table illustrating an aggregation of the data in the second test.

FIG. 12 is a table illustrating a blend of a basic feed given to broilers in a third test.

FIG. 13 is a table illustrating the concentration of acetylcysteine added to the basic feed according to the age in days of the broilers tested in the third test.

FIG. 14 is a table illustrating the data obtained in the third test, the average weight, the gained weight, the feed intake, and the feed conversion rate.

DESCRIPTION OF EMBODIMENT

Figure 6:
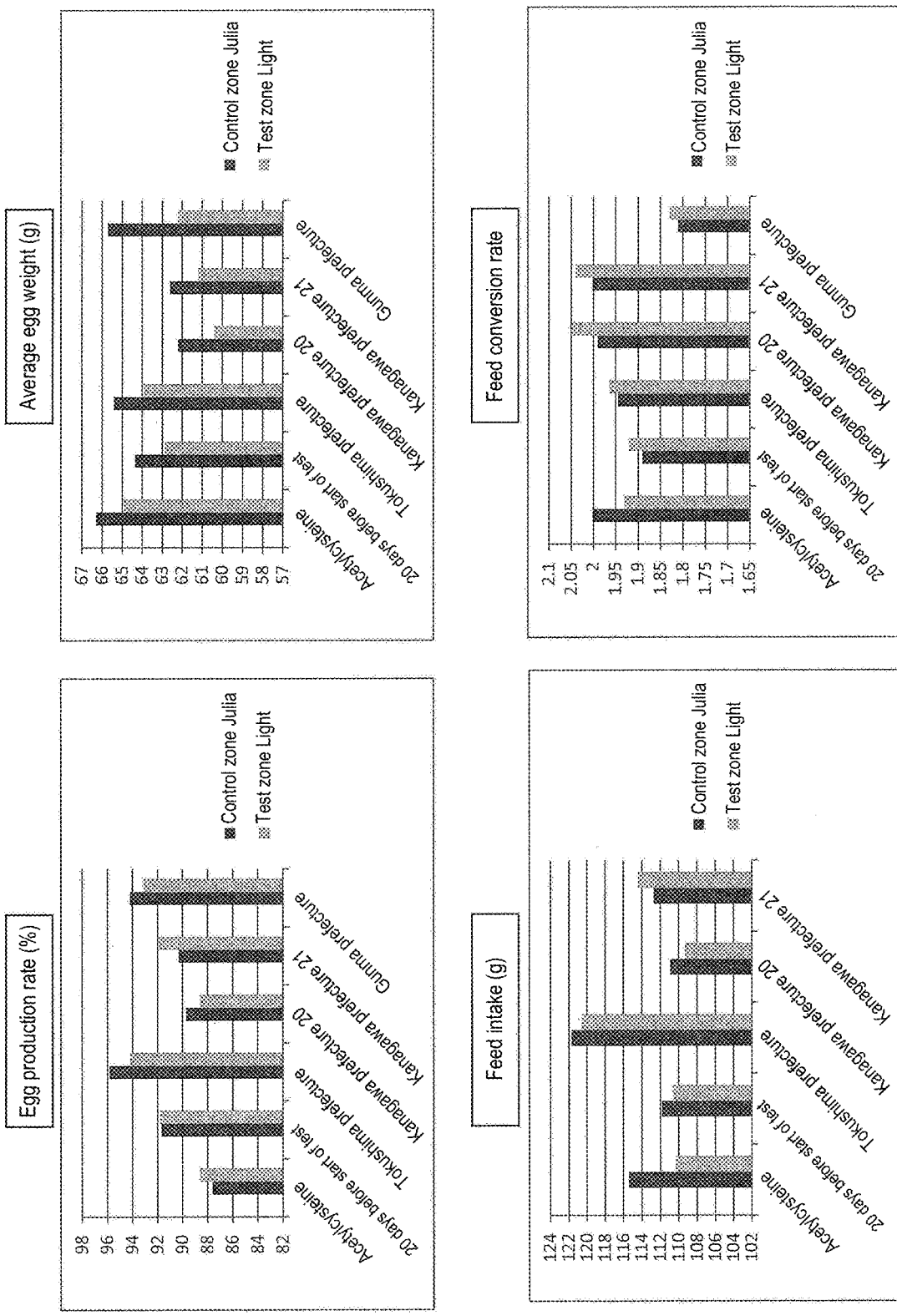
FIG. 6 is a bar graph illustrating the comparison between the test data of the first test and the test data of the comparative tests performed in the experimental laboratories of the prefectures.

The agent for improving a feed conversion rate, the agent for improving a survival rate, the agent for improving the number of eggs laid by an egg-laying hen, and the method of giving these agents to animals, and the feed according to an embodiment will now be described below.

<Agent for Improving Feed Conversion Rate, Agent for Improving Survival Rate, Agent for Improving the Number of Eggs Laid by Egg-Laying Hen>

The agent for improving a feed conversion rate, the agent for improving a survival rate, and the agent for improving the number of eggs laid by an egg-laying hen according to an embodiment comprise at least one effective ingredient selected from cysteine and cysteine derivatives. The cysteine and cysteine derivatives are white crystal or crystalline powder, and are highly water-soluble. Accordingly, the effective ingredient selected from the cysteine and cysteine derivatives can be used in the form of powder as the agent for improving a feed conversion rate, the agent for improving a survival rate, and the agent for improving the number of eggs laid by an egg-laying hen, or can be dissolved in water as the agent for improving a feed conversion rate, the agent for improving a survival rate, and the agent for improving the number of eggs laid by an egg-laying hen to be used. Cysteine is one of amino acids, 2-amino-3-sulfanylpropionic acid, also referred to as thioserine. Cysteine includes L-cysteine, D-cysteine, and DL-cysteine. Examples of the cysteine derivatives can include acetylcysteine, S-methyl-L-cysteine (SMC), cysteine malate, N-acetylcysteineamide, N-acetylcysteine ethyl ester, N-acetyl β,β-dimethylcysteine ether ester (N-acetylpenicillamine ethyl ester), N-acetyl β,β-cysteine (N-acetylpenicillamine), glutathione ethyl ester, N-acetylglutathione ethyl ester, N-acetylglutathione, N-acetyl a-glutamyl ethyl ester cysteinylglycyl ethyl ester (N-acetyl (β-ethyl ester)glutathione ethyl ester), N-acetyl α-glutamylethyl ester cysteinylglycine (N-acetyl (β-ethyl ester) glutathione), γ-glutamylcysteine ethyl ester, N-acetylglutathione amide, N-acetyl β,β-dimethylcysteine amide, N-acetyl β-methylcysteine amide, and N-acetylcysteine glycine amide. Any water that does not cause health damage to animals may be used to dissolve the effective ingredient. Not only pure water and tap water but also water in well, rivers, and lakes and rain water can also be used.

Acetylcysteine is particularly suitably used as the at least one effective ingredient selected from the cysteine and cysteine derivatives. This is because acetylcysteine has strong antioxidative action, and assists the prevention of aging in the living body, discharge of heavy metals such as lead, cadmium, and mercury to the outside of the body, and the prevention of respiratory disorders such as bronchitis and asthma. Acetylcysteine is white crystal or crystalline powder, and is highly water-soluble.

The agent for improving a feed conversion rate, the agent for improving a survival rate, and the agent for improving the number of eggs laid by an egg-laying hen according to the embodiment may comprise at least one substance selected from pharmaceuticals for animals, amino acids other than cysteine and the cysteine derivatives, and vitamins added thereto. This is because these pharmaceuticals for animals, amino acids, and vitamins are effective in recovering, maintaining, and enhancing the animal health, and a further improvement in a feed conversion rate is expected.

The agent for improving a feed conversion rate, the agent for improving a survival rate, and the agent for improving the number of eggs laid by an egg-laying hen according to the embodiment demonstrate sufficient effects by giving about 1 mg/day/Kg of the effective ingredient, i.e., cysteine and a cysteine derivative to animals.

<Method of Giving Agent for Improving Feed Conversion Rate, Agent for Improving Survival Rate, and Agent for Improving the Number of Eggs Laid by Egg-Laying Hen>

The agent for improving a feed conversion rate, the agent for improving a survival rate, and the agent for improving the number of eggs laid by an egg-laying hen according to the embodiment can be given to animals as drinking water, or can be given to animals by spraying the agent in a feed. If the agent for improving a feed conversion rate, the agent for improving a survival rate, or the agent for improving the number of eggs laid by an egg-laying hen is given to animals as drinking water, the agent for improving a feed conversion rate, the agent for improving a survival rate, or the agent for improving the number of eggs laid by an egg-laying hen can be uniformly given to a large number of animals raised in a livestock farm in a fixed concentration, improving the feed conversion rate, the survival rate, and the number of eggs laid by an egg-laying hen in the entire livestock farm. The agent for improving a feed conversion rate, the agent for improving a survival rate, and the agent for improving the number of eggs laid by an egg-laying hen according to the embodiment each are an aqueous solution of the effective ingredient, and therefore can be sprayed in the feed with a spray, readily providing the effective ingredient in the feed with an even concentration. Accordingly, the agent for improving a feed conversion rate, the agent for improving a survival rate, and the agent for improving the number of eggs laid by an egg-laying hen can be readily uniformly given to a large number of animals raised in the livestock farm with an even concentration, improving the feed conversion rate, the survival rate, and the number of eggs laid by an egg-laying hen in the entire livestock farm.

The feed conversion rate can be improved by giving animals about 1 mg/day/Kg of the agent for improving a feed conversion rate, the agent for improving a survival rate, or the agent for improving the number of eggs laid by an egg-laying hen according to the embodiment. The agent for improving a feed conversion rate, the agent for improving a survival rate, and the agent for improving the number of eggs laid by an egg-laying hen do not always have to be daily given, and may be given at about 1 mg/day/Kg in average for one day. In other words, in the case where the agent for improving a feed conversion rate, the agent for improving a survival rate, or the agent for improving the number of eggs laid by an egg-laying hen is daily given to animals, about 1 mg/Kg of the agent for improving a feed conversion rate, the agent for improving a survival rate, and the agent for improving the number of eggs laid by an egg-laying hen are daily given to animals. In the case where the agent for improving a feed conversion rate, the agent for improving a survival rate, or the agent for improving the number of eggs laid by an egg-laying hen is given to animals one time every three to five days, the agent for improving a feed conversion rate, the agent for improving a survival rate, and the agent for improving the number of eggs laid by an egg-laying hen are given to animals in an amount equivalent to the amount represented by 1 mg/Kg×the number of days for every feeding time. If the frequency to give the agent for improving a feed conversion rate, the agent for improving a survival rate, or the agent for improving the number of eggs laid by an egg-laying hen is one time every three to five days, the efforts needed to giving the agent for improving a feed conversion rate, the agent for improving a survival rate, and the agent for improving the number of eggs laid by an egg-laying hen can be reduced, leading to an improvement in productivity in the entire livestock farm. The agent for improving a feed conversion rate, the agent for improving a survival rate, and the agent for improving the number of eggs laid by an egg-laying hen according to the embodiment can be added to drinking water, or can be added to the feed. The addition thereof to the feed is more advantageous in improving the productivity of the livestock farm.

The feeding amounts of the agent for improving a feed conversion rate, the agent for improving a survival rate, and the agent for improving the number of eggs laid by an egg-laying hen according to the embodiment are determined in consideration of the heat stress to animals. In other words, the feeding amounts of the agent for improving a feed conversion rate, the agent for improving a survival rate, and the agent for improving the number of eggs laid by an egg-laying hen are increased during a period where the heat stress is high, and the feeding amounts of the agent for improving a feed conversion rate, the agent for improving a survival rate, and the agent for improving the number of eggs laid by an egg-laying hen are decreased during a period where the heat stress is low. Thereby, the feed conversion rate, the survival rate, and the number of eggs laid by an egg-laying hen can be maintained through the year without wasting the agent for improving a feed conversion rate, the agent for improving a survival rate, and the agent for improving the number of eggs laid by an egg-laying hen.

<Feed>

The feed according to an embodiment comprises cysteine and cysteine derivatives as an effective ingredient added to an animal basic feed. The effective ingredient can be added to the basic feed by a method of spraying the agent for improving a feed conversion rate, the agent for improving a survival rate, or the agent for improving the number of eggs laid by an egg-laying hen, which is an aqueous solution of the effective ingredient, to the basic feed with a spray, or by a method of spraying and mixing a powdery effective ingredient as it is to the basic feed.

The amount of the effective ingredient to be added to the basic feed is controlled so as to be 1 mg/day/Kg. The frequency to give the feed containing the effective ingredient added thereto may be daily, or may be one time every three to five days. In the case where the feed containing the effective ingredient added thereto is given one time every three to five days, the feed is increased such that the amount of the effective ingredient to be added to the basic feed is 1 mg/day/Kg.

<Acetylcysteine Feeding Test>

The present applicant performed first to third tests about egg-laying hens and chickens for meat to verify the difference in the number of eggs laid and the difference in weight increase rate between in the case where acetylcysteine is given and the case where acetylcysteine is not given. The test methods and the results of the tests will be shown below.

(First Test)

The first test was performed by giving an aqueous solution of acetylcysteine to egg-laying hens as drinking water.

<Target Animal for Test>

Adult egg-laying hens were selected as the target animal for the test because data is readily collected. The point of time when the test was started was at off-peak times in egg laying.

<Chicken Breed>

Two breeds Julia and Julia Light were used.

Julia is the most popular breed raised in Japan, and lays a large number of eggs of size L. In contrast, Julia Light is an improved breed of Julia, and lays a large number of eggs of size M.

Although it is desirable that the test be performed on the same breed in a test zone and a control zone for the accuracy of the test, the test was performed on different breeds for reasons related to equipment.

The data from the developer of these breeds shows that there is no difference between Julia and Julia Light in the feed conversion rate, and the number of deaths and cullings. Many of the results of the tests performed in the experimental laboratories of the prefectures contain the data indicating that Julia in the control zone is superior to Julia Light in the test zone. For this reason, in the main test, Julia having a low feed conversion rate (high profitability) was raised in the control zone and Julia Light having a high feed conversion rate (low profitability) was raised in the test zone.

<The Number of Chickens>

The number of hens in the test zone was 33412 Julia Light hens and that in the control zone was also 33412 Julia hens.

<Place where Test was Performed>

The test zone and the control zone were placed in Akagiyama Farm run by Takai Poultry Farm Y.K., where chickens are actually raised, to perform the test in an actual situation.

A windowless house was used because differences between individuals and differences in heath conditions are small.

The house was provided with a cage having a width of 380 mm, a length of 500 mm, and a height of 380 mm. The cage had a water nipple at both ends of the ceiling.

<Test Period>

To avoid application of heat stress to the target chickens for the test, the test was performed for 166 days from October 21, Heisei 27 to April 3, Heisei 28. At a temperature inside the house of more than 27° C., the feed demand (feed intake) of the chickens will reduce due to heat stress.

<Feed>

A Kumiai Blend Feed "Akagikougen 17 Up for adult chicken" shown in FIG. 1 was given from October 21, Heisei 27 to February 13, Heisei 28, and a Kumiai Blend Feed "Akagikougen 16 Up for adult chicken" shown in FIG. 2 was given from February 23 to April 3, Heisei 28.

<Agent for Improving Feed Conversion Rate, Agent for Improving Survival Rate, Agent for Improving the Number of Eggs Laid by Egg-Laying Hen, and Method of Giving These>

As the agent for improving a feed conversion rate, the agent for improving a survival rate, or the agent for improving the number of eggs laid by an egg-laying hen, an aqueous solution of acetylcysteine was given to Julia Light in the test zone as drinking water through the nipples disposed at both ends of the ceiling of the cage.

The concentration of acetylcysteine in drinking water was prepared such that 1 mg/day/Kg acetylcysteine was given to the egg-laying hens. Specifically, 3.3 L per day of a stock solution having an acetylcysteine concentration of 10% was used for 33412 Julia Light hens having a weight of about 2 Kg.

The frequency to give the agent for improving a feed conversion rate, the agent for improving a survival rate, or the agent for improving the number of eggs laid by an egg-laying hen was one time for 5 days.

Water not containing agent for improving a feed conversion rate, the agent for improving a survival rate, or the agent for improving the number of eggs laid by an egg-laying hen was given to Julia in the control zone through the nipple.

<Results of First Test>

FIG. 3 shows the number of deaths and cullings (unit: bird), the number of eggs laid (unit: egg), the feed demand (unit: g), the egg production rate (unit: %), and the egg weight (unit: g) of the target chickens for the test in the test zone and the control zone in each day of giving the agent for improving a feed conversion rate, the agent for improving a survival rate, or the agent for improving the number of eggs laid by an egg-laying hen. The lower columns in FIG. 3 show the difference in the number of deaths, the difference in the number of eggs laid, the average feed demand, the average egg production rate, and the average egg weight between the target chickens for the test and the control during the test period. Furthermore, the lowest column in FIG. 3 shows the percentage of the value of the test zone to the value of the control zone.

In addition, as a reference, FIG. 3 shows the number of times to give the agent for improving a feed conversion rate, the agent for improving a survival rate, and the agent for improving the number of eggs laid by an egg-laying hen and the age in days (in weeks) of the target chickens for the test on the day when the agent for improving a feed conversion rate, the agent for improving a survival rate, and the agent for improving the number of eggs laid by an egg-laying hen were given, and the highest and lowest temperatures inside the house on the day when the agent for improving a feed conversion rate was given.

A smaller number of deaths and cullings of the target chickens for the test are preferred. A larger number of eggs laid are preferred. A smaller feed demand (feed intake) is preferred although it should be balanced with the egg production rate and the egg weight. A larger egg production rate is preferred. A larger egg weight and a larger average egg weight are preferred. The feed conversion rate of the target egg-laying hen for the test is calculated as a ratio of the total weight of eggs laid to the feed demand as described above. The feed demand is calculated as a product of the feed intake, the number of birds, and the survival rate. The total weight of eggs laid is calculated as a product of the number of birds, the egg production rate, and the average egg weight.

The feed conversion rate of the target egg-laying hen for the test is represented by a ratio of the amount of feed given to the total weight of eggs laid as described above. The amount of feed given is determined as a product of the feed intake (feed demand), the number of birds, and the survival rate. The total weight of eggs laid is determined as a product of the number of birds, the egg production rate, and the average number egg weight. From the data in FIG. 3, the feed conversion rate of the egg-laying hen during the test period was determined. The feed conversion rate in the control zone was 1.99 while the feed conversion rate in the test zone was 1.92. Accordingly, the proportion of the feed conversion rate in the test zone to the feed conversion rate in the control zone was 96.48%, which was a 3.52% reduction.

As apparent from the data in FIG. 3, the number of eggs laid in the test zone increased 1.67% compared to the number of eggs laid in the control zone, the average egg production rate in the test zone increased 1.13% compared to the average egg production rate in the control zone, and the average egg weight in the test zone decreased 2.16% compared to the average egg weight in the control zone. From these experimental results, it is apparent that the productivity of eggs is not negatively affected by giving the egg-laying hens the agent for improving a feed conversion rate, the agent for improving a survival rate, and the agent for improving the number of eggs laid by an egg-laying hen according to the embodiment, and it can be said that the feed conversion rate is significantly improved by giving the egg-laying hens the agent for improving a feed conversion rate, the agent for improving a survival rate, and the agent for improving the number of eggs laid by an egg-laying hen according to the embodiment.

As apparent from the data in FIG. 3, the number of deaths and cullings in the test zone are reduced significantly, i.e., 20% compared to the number of deaths and cullings in the control zone. In addition, difference between the control zone and the test zone in the feed conversion rate and that in the number of deaths and cullings both tend to increase according to an increase in the age in days, and it can be said that cumulative effects are obtained by giving the agent for improving a feed conversion rate, the agent for improving a survival rate, and the agent for improving the number of eggs laid by an egg-laying hen. Furthermore, the egg production rate in the test zone exceeds that in the control zone while the number of deaths and cullings in the test zone are below those in the control zone. Accordingly, the number of eggs laid in the test zone increased 1.67% compared to the number of eggs laid in the control zone.

The references for statistical significance include the 5% level (P<0.05), the 1% level (P<0.01), and the 0.1% level (P<0.001). The 5% level is applied to the case of high probability that an error caused by the number of samples is increased. The 1% level is applied to the case of high probability that an error caused by the number of samples is decreased. The 0.1% level is applied to the case of high probability that an error caused by the number of samples is significantly reduced.

As described above, the feed conversion rate in the test zone improved 3.52% compared to that in the control zone, and sufficiently satisfies the 1% level although it does not reach the 5% level of statistical significance. The number of samples in the main test was 33412 hens, which is a large number of samples. The agent for improving a feed conversion rate, the agent for improving a survival rate, and the agent for improving the number of eggs laid by an egg-laying hen were given many times, i.e., 27 times. The test period was long, i.e., 166 days. Accordingly, it can be said that at the 1% level, the feed conversion rate was improved with a significance of 3.52% by giving the egg-laying hens the agent for improving a feed conversion rate, the agent for improving a survival rate, and the agent for improving the number of eggs laid by an egg-laying hen according to the embodiment.

The number of egg-laying hens raised in a single livestock farm is large, such as several ten thousands to millions or more hens. The total number of egg-laying hens raised in Japan amounts about 170 million hens. The results of the main test greatly contribute to an improvement in profitability of livestock farms. By way of one example, 36,000 tons of feed are consumed in Takai Poetry Farm Y.K. where the test was performed. If 4.67% of the feed demand is reduced as shown in FIG. 3 and the feed cost is 50,000 yen per ton, a reduction in expense will be 84 million yen a year.

Moreover, a reduction in feed demand results in a reduction in feces, reducing the expense for treating feces and leading to an improvement of the environmental problems such as pollution by livestock. Furthermore, accompanied by this, a reduction in feed demand can reduce the discharge of greenhouse effect gases, i.e., methane and nitrous oxide, also contributing to the prevention of global warming. In addition, a reduction in feed demand also reduces the consumption of feed crops, contributing to the solutions to not only economic problems but also food problems.

A reduction in feed intake of the egg-laying hen tends to increase the egg breakage rate. For this reason, a tester visually observed the surface roughness of shells of the eggs collected in the test zone and the control zone to infer whether the surface roughness caused a difference in egg breakage rate or not. This is because it is known that an egg having a rough surface has a thin egg shell and is easy to break. From the results obtained by visual observation, the eggs collected in the test zone had finer and smoother surfaces than those of the eggs collected in the control zone. From such an appearance, sufficient strength of their egg shells was observed, and it was inferred that the egg breakage rate was low. Accordingly, it can be said that there was no influence over the egg shell caused by a reduction in feed intake.

The main component of the egg shell is calcium carbonate, and calcium is added to the feed to form a hard egg shell which barely breaks (see FIGS. 1 and 2). The feces in the test zone and the control zone were washed with water to observe the solid products. Calcium was found in the control zone while no calcium was found in the test zone. This suggests that the calcium added to the feed was well absorbed by the egg-laying hens in the test zone. Thus, from this fact, it is inferred that a hard egg shell is formed with a small feed demand in the test zone, reducing the egg breakage rate.

A preparative test was performed over 20 days before the start of the test to verify the effects of the agent for improving a feed conversion rate according to the embodiment. The preparative test was performed on the same test condition as that of the test to verify the effects of the agent for improving a feed conversion rate, the agent for improving a survival rate, and the agent for improving the number of eggs laid by an egg-laying hen according to the embodiment except that the agent for improving a feed conversion rate, the agent for improving a survival rate, and the agent for improving the number of eggs laid by an egg-laying hen were not given to the target chickens for the test in the test zone. The results of the preparative test are shown in FIG. 4.

As illustrated in FIG. 4, the feed conversion rate in the test zone increased 1.59% compared to the feed conversion rate in the control zone in the preparative test. As described above, the feed conversion rate in the test zone decreased 3.52% compared to the feed conversion rate in the control zone in the test to verify the effects of the agent for improving a feed conversion rate, the agent for improving a survival rate, and the agent for improving the number of eggs laid by an egg-laying hen according to the embodiment. Accordingly, in consideration of the test data of the preparative test shown in FIG. 4, the feed conversion rate in the test zone improved 5.11% compared to that in the control zone.

Moreover, the comparative data of the test performed on Julia and Julia Light in the past was considered in the evaluation in the test to verify the effects of the agent for improving a feed conversion rate, the agent for improving a survival rate, and the agent for improving the number of eggs laid by an egg-laying hen according to the embodiment. As the comparative data of the test in the past, the followings were used: the test data of the comparative test performed in an experimental laboratory of Tokushima prefecture in Heisei 27, the test data of the comparative test performed in an experimental laboratory of Gunma prefecture in Heisei 27, the test data of the comparative test performed in an experimental laboratory of Kanagawa prefecture in Heisei 20, and the test data of the comparative test performed in an experimental laboratory of Kanagawa prefecture in Heisei 21. The comparative tests performed in the experimental laboratories in each of these prefectures used 100 birds.

Figure 5:
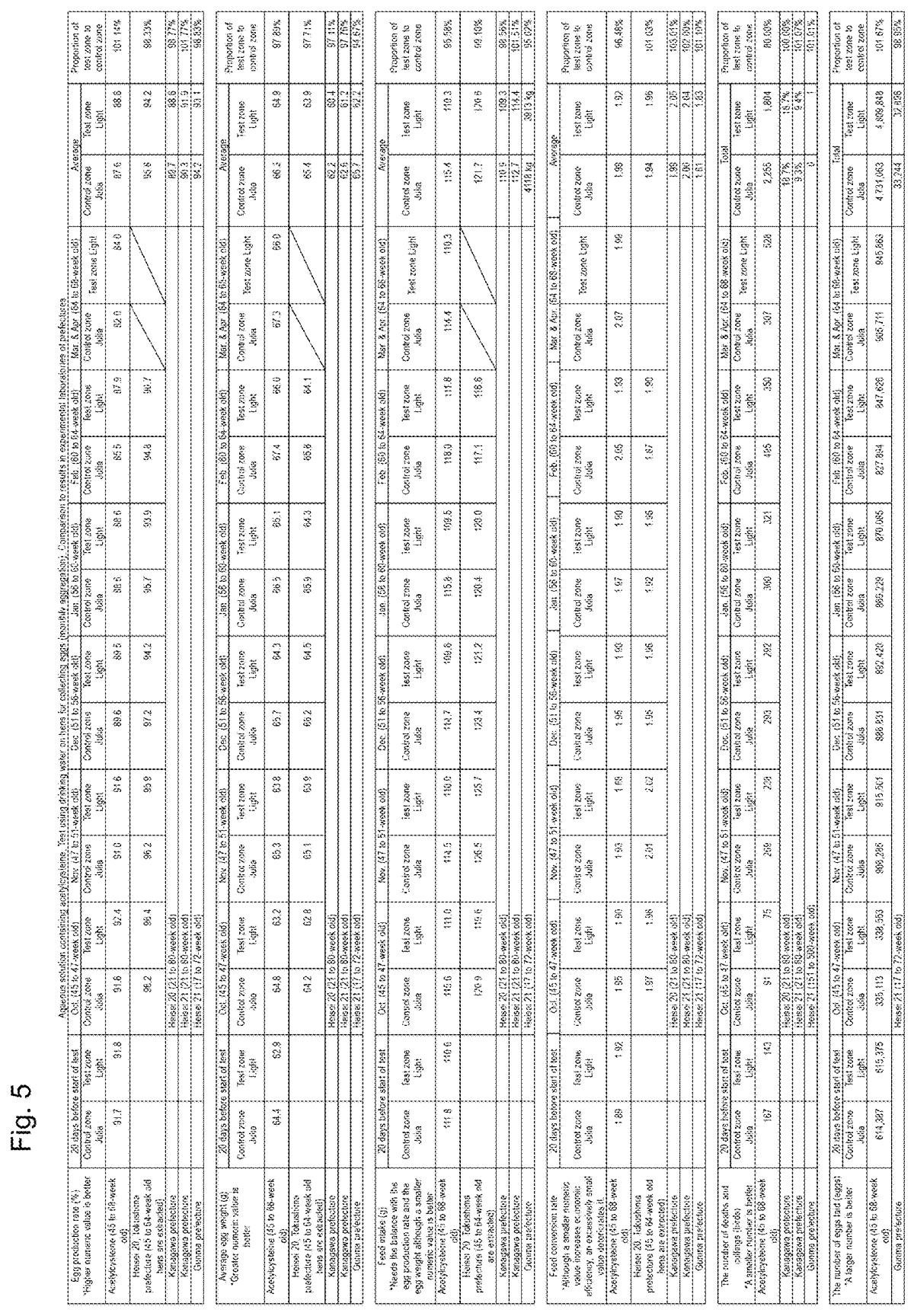

FIG. 5 illustrates a comparison between the test data of the test to verify the effects of the agent for improving a feed conversion rate, the agent for improving a survival rate, and the agent for improving the number of eggs laid by an egg-laying hen according to the embodiment and the test data of the comparative tests performed in the experimental laboratories of the prefectures. FIG. 6 illustrates a bar graph of the test data of the test to verify the effects of the agent for improving a feed conversion rate, the agent for improving a survival rate, and the agent for improving the number of eggs laid by an egg-laying hen according to the embodiment and the test data of the comparative tests performed in the experimental laboratories of the prefectures above. Furthermore, FIG. 7 illustrates a comparison among the test data of the test to verify the effects of the agent for improving a feed conversion rate, the agent for improving a survival rate, and the agent for improving the number of eggs laid by an egg-laying hen according to the embodiment, the test data of the preparative test, and the test data of the comparative tests performed in the experimental laboratories of the prefectures above.

In FIGS. 5, 6, and 7, the test data of the test to verify the effects of the agent for improving a feed conversion rate, the agent for improving a survival rate, and the agent for improving the number of eggs laid by an egg-laying hen according to the embodiment is shown under the column represented as "acetylcysteine," and the test data of the preparative test is shown under the column represented by "20 days before start of test." The test data of the test performed in the experimental laboratory of Tokushima prefecture in Heisei 27, the test data of the test performed in the experimental laboratory of Kanagawa prefecture in Heisei 20, the test data of the test performed in the experimental laboratory of Kanagawa prefecture in Heisei 21, and the test data of the test performed in the experimental laboratory of Gunma prefecture in Heisei 27 are shown under the columns represented by "Tokushima prefecture," "Kanagawa prefecture 20," "Kanagawa prefecture 21," and "Gunma prefecture," respectively.

As apparent from the test data shown in FIGS. 5 to 7, it was verified that the proportion of the feed conversion rate in the test zone to that in the control zone was 96.50% in the test to verify the effects of the agent for improving a feed conversion rate, the agent for improving a survival rate, and the agent for improving the number of eggs laid by an egg-laying hen according to the embodiment. In contrast, it is found that the proportion of the feed conversion rate in the test zone to that in the control zone was 101.03% to 103.01% in the preparative test and the comparative tests in the experimental laboratories of the prefectures above, and the feed conversion rate reduced 4.53% to 6.51% in the case where the agent for improving a feed conversion rate, the agent for improving a survival rate, and the agent for improving the number of eggs laid by an egg-laying hen according to the embodiment were given, compared to the case where these agents were not given.

(Second Test)

The second test was performed by giving a feed, to which powdery acetylcysteine was added, to egg-laying hens.

<Chicken Breed and the Number of Birds>

120 individuals having an egg production rate of 82% or more 4 weeks before the start of the preparative raising were selected from Julia Light birds (281-day old when partitioned) which were being raised in the scientific feed research center of Japan Scientific Feeds Association to be fed.

<Setting of Test Zone>

Three zones were set: a control zone where a basic feed not having acetylcysteine added thereto was given, a first test zone (standard zone) where a feed comprising a basic feed to which 0.0014% acetylcysteine was added was given, and a second test zone (5-fold zone) where a feed comprising a basic feed to which 0.0072% acetylcysteine was added was given.

Tested hens were divided into two groups each composed of 10 birds such that each group had an approximately equal distribution of the egg production. Four groups were assigned to each zone, and the basic feed was given for 14 days to accustom the tested hens to the test environment. After that, the feed corresponding to each zone was given for 4 weeks.

The basic feed shown in FIG. 8 was used.

<Intake of Acetylcysteine>

Also in the second test, a standard daily intake of acetylcysteine per bird is planned to be 1 mg per weight (Kg) of a tested hen. In the main test, from the weight at the start of preparative raising and the feed intake one week after the start of preparative raising, assuming that the weight of a tested hen was 1580 g and a daily feed intake per bird was 140 g, the amount of acetylcysteine to be added to the basic feed was set from the following expression:

standard zone: amount (%) of acetylcysteine to be added to the basic feed=weight (1580 g)×acetylcysteine intake (1 mg/weight (Kg))/feed intake (114 g/day/bird)×100

5-fold zone: amount (%) of acetylcysteine to be added to the basic feed=weight (1580 g)×acetylcysteine intake (5 mg/weight (Kg))/feed intake (114 g/day/bird)×100

<Management of Raising>

The tested hens were individually managed in a terraced individual cage for egg-laying hens disposed in an open chicken house. A set of 10 continuous cages was used for each group, and a single empty cage was disposed between the zones. The feed and drinking water were continuously given. The light beams were controlled such that the bright period was 14 hours and the dark period was 10 hours.

<Analysis of Results>

A variation in weight, the average egg weight, the daily egg production amount, the feed intake, and the feed efficiency were subjected to analysis of variance by a method of one-way analysis of variance using the given feed as a factor, and the superiority in each interval was examined. The egg production rate was subjected to arcsine transformation, and the superiority of the difference between intervals was similarly examined. The culling hens were excluded from the average back to the start of the test, and the results of egg production and the like were summarized. The egg production rate during the test period was subjected to rejection test, and the individuals whose egg production rate was determined as abnormal were also excluded from the average back to the start of the test.

<Place where Test was Performed>

The scientific feed research center of Japan Scientific Feeds Association (821 Yoshikura, Naritashi, Chiba)

<Test Period>

The test was performed for 42 days from September 21 to November 2, Heisei 28. The 14 days from September 21 to October 5, Heisei 28 was the preparative test period, and the 28 days from October 6 to November 2, Heisei 28 was the main test period.

<Results of Second Test>

FIG. 9 shows the average weight of the tested hens at the start of the test and the average weight of the tested hens at the end of the test. As apparent from the data in FIG. 9, the weight at the start of the test was 3.1% lower in the standard zone and 2.2% in the 5-fold zone than that in the control zone. At the end of the test, the weight in the standard zone was 0.5% larger than that in the control zone and the weight in the 5-fold zone was approximately equal to that in the control zone. The weights in these two zones were close to the index weight of the chicken breed. This suggests that the health conditions of the hens in the test zone (standard zone and 5-fold zone) were improved. From this, it is believed that the feed intakes in the test zone significantly transitioned from the preparative test period to the main test period because the weights at the start of the test were smaller than that in the control zone.

FIG. 10 shows the data (data from Japan Scientific Feeds Association) of the feed intake, the egg production rate, the egg weight, and the feed conversion rate obtained by the second test. FIG. 10 also shows the data (ordinary management data in the chicken farm) of the feed intake, the egg production rate, the egg weight, and the feed conversion rate obtained by the test performed in the chicken farm under the same feed giving conditions as those in the second test. FIG. 11 shows the aggregated data of the second test.

As apparent from the data in FIGS. 10 and 11, the feed intake, the egg production rate, the egg weight, and the feed conversion rate in the data from Japan Scientific Feeds Association were superior to those in the ordinary management data in the chicken farm. It is believed that this is because the raising environment in the scientific feed research center was in a better condition than in the raising environment in the chicken farm.

Compared between the control zone and the test zone (the standard zone and the 5-fold zone), the feed intake, the egg production rate, the egg weight, and the feed conversion rate in the test zone were more significantly improved than those in the control zone. In particular, the egg production rate for 28 days by 42- to 46-week old hens reduces to about 91 to 92% as shown by the index of the chicken breed during this period. Contrary to this, the data from Japan Scientific Feeds Association shows a result highly superior to the index, and the egg production rate in the standard zone was 99.2% and that in the 5-fold zone was 98.6%. The feed conversion rate was 4.43% higher than that in the control zone, although the given feed contained 0.2% DL-methionine, which is a precursor of cysteine.

If the amount thereof daily given to a hen is about 1.6 mg, the yearly amount will be about 600 mg. The acetylcysteine content in the ordinary supplement for people is 600 mg per tablet, and 2 to 3 tablets a day are taken. In other words, aliquots of the amount of one tablet that a person takes as a health food product were given to the hens over one year to obtain the effect. The health condition was improved with a very small amount given, achieving the effect of improving the feed conversion rate. Acetylcysteine is called anti-aging supplement, and it is expected that a more significantly effect will be obtained in a delay of aging, of course, and under conditions where so much stress such as heat stress is applied. It is also expected that a delay of aging might lead to a possibility that forced molting and induced of molting considered as problems in animal welfare are unnecessary. It is believed that accurate results are not obtained without performing tests in a raising environment in a chicken farm, and therefore such a test will be performed after the approval thereof for use as a feed additive. Actually, a more than 5% improvement in feed conversion rate is found in the test of the old hens in the chicken farm. Furthermore, a reduction in the number of deaths and cullings and an improvement in quality of the egg shell are verified. These are inferred as phenomena caused by improved health conditions of the hens.

(Third Test)

A third test was performed by giving chickens for meat (broilers) a feed having powdery acetylcysteine added thereto.

<Chicken Breed and the Number of Birds>

300 (150 males and 150 females) broiler-dedicated breed day-old chicks (broilers available from Nippon Chunky Co., Ltd.) are fed. As the chicks, about 350 birds (175 males and 175 females) were introduced, and individuals not having any abnormal health condition and having a close weight were selected and used in the test.

<Setting of Test Zone>

Two zones in total were set: a control zone to give a basic feed which almost satisfied the requirement for nutrients specified in Japanese Feeding Standard for Poultry (2011 version) and did not have acetylcysteine added thereto, and a test zone to give a basic feed to which acetylcysteine was added such that the daily intake of acetylcysteine was 1 mg/Kg of a tested hen.

FIG. 12 shows a blend of basic feed. As shown in FIG. 12, 0.25% DL-methionine was added to the basic feed for a first period of raising and 0.18% DL-methionine was added to the basic feed for a second period of raising in this example. The nutritional value of this basic feed is adjusted so as to be lower than the index.

FIG. 13 shows the concentration of acetylcysteine added to the basic feed according to the age in days of the tested chickens. The concentration of acetylcysteine added to the basic feed was determined based on the aimed results for Chunky broiler (2014).

The tested chicks were divided into 6 groups each composed of 50 birds (25 males and 25 females) such that each group had an approximately equal weight distribution. Three groups were assigned to the control zone and the test zone, respectively, and the chicks were raised until 49-day old.

<Management of Raising>

Each flock of tested chicks was raised in an electrically heated windowless chicken house of a forced ventilation (air exhaust) type.

For vaccination, chicks vaccinated with Marek's vaccine and live fowl pox vaccine when born were introduced, and were additionally vaccinated with NB live vaccine at 4-day old and 15-day old and with live fowl pox vaccine at 21-day old.

The feed and drinking water were continuously given.

<Results of Third Test>

Figure 14:
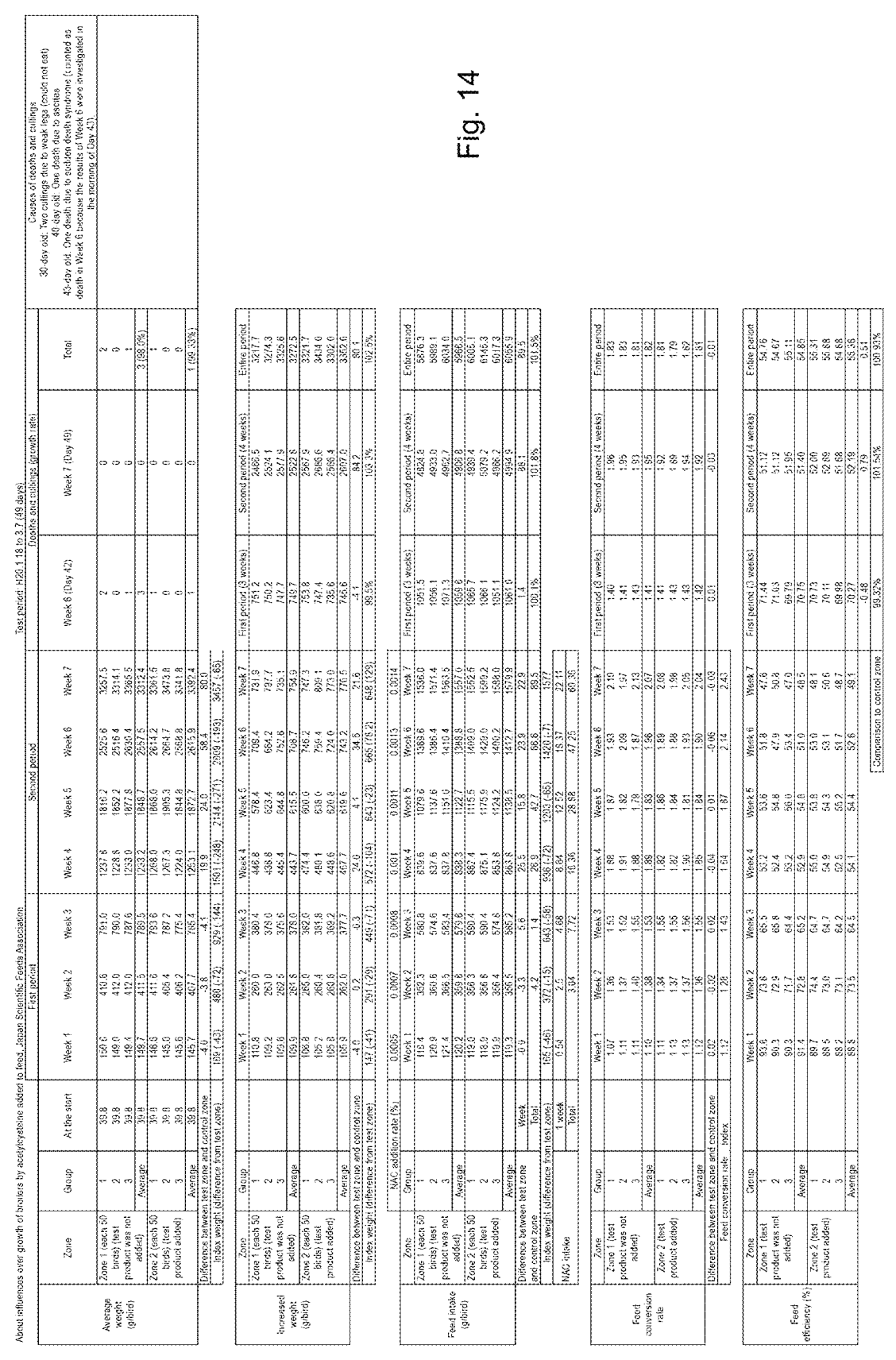

FIG. 14 shows the data of the average weight, the increased weight, the feed intake, and the feed conversion rate obtained by the third test.

As apparent from the data in FIG. 14, the feed conversion rate in the test zone was 100.55% relative to that in the control zone, and the feed efficiency in the test zone was 100.93% relative to that in the control zone. The feed efficiency for three weeks of the first period in the test zone was 99.32% relative to and lower than that in the control zone. The feed efficiency for Weeks 4 to 7 of the second period was 101.54% relative to that in the control zone. The number of deaths and cullings was 3 birds in the control zone and 1 bird in the test zone. The growth rate in the control zone was 98% and that in the test zone was 99.3%. The growth rate in the test zone was higher than that in the control zone.

The results for the three weeks of the first period in the test zone were lower than those in the control zone. It is inferred that this is because the amount of acetylcysteine given for the three weeks of the first period was inappropriate. In particular, negative influences appeared in the results of Week 1, and it is considered that these influences remained till Week 3. For the four weeks of the second period, the results in the test zone are clearly higher than those in the control zone, and it is considered that the amount of acetylcysteine given was appropriate. From this, it is considered that if the amount of acetylcysteine given for the three weeks of the first period is appropriate, the results for the four weeks of the second period in the control zone can be more significantly improved.

The number of deaths and cullings was 3 birds in the control zone in Week 6 (two cullings due to weak legs, one death due to ascites), and was 1 bird in the test zone in Week 6 (sudden death syndrome).

A research report is found about a test to give 1% glycine approved as a feed additive to chickens for meat, in which negative influences appeared at 7-day old and the weights of chickens of 7-day old were smaller than those without giving glycine while giving glycine from 2-week old to 7-week old led to good results (2009. 3, Agriculture, Forestry and Fisheries Research Council). One of its causes is that the immune system almost matures at 7-day old. However, negative influences appeared at 7-day old in the case where acetylcysteine was given, although good results were obtained at 7-week old. From this data, it is inferred that an appropriate amount of acetylcysteine to be given can increase the weights of the chickens for meat from 7-day old to 7-week old. It is believed that similarly to glycine, it is appropriate to wait for the maturing of the immune system of chicks for meat and give them acetylcysteine from 2-week old.

As described above, as the result of the test on the chickens for meat, the feed intake was large, an increase in weight was large, and the number of deaths and cullings was small in the test zone where acetylcysteine was given. Accordingly, it is inferred that the health condition was good.

In Japan, use of cysteine and cysteine-related substances (methionine, cystine, and taurine) is approved not only in pharmaceuticals but also other applications. Furthermore, use of glutathione is also approved in the applications other than pharmaceuticals. Unfortunately, use of a cysteine-related substance acetylcysteine as a supplement was approved until Heisei 27; however, acetylcysteine is approved as only pharmaceuticals since Heisei 28.

Other acetylcysteine-related substances methionine and taurine were specified as feed additives in 1979 and in 2009, respectively in Japan. Cystine (in which two cysteine molecules bind) is specified as a feed additive for supplementing sulfur in EU. Addition thereof with methionine to a blend feed for pigs for reducing environmental load is approved in Japan. However, use of cystine to chickens is not approved.

In the animal bodies, cysteine is generated from methionine, and cystine and taurine are generated from cysteine. It is believed that cysteine and cystine have the same nutritional advantages. Cysteine is not used as a feed additive although these cysteine-related substances are used. It is believed that this is mainly because cysteine has poor storage stability, and is readily oxidized by light or oxygen, not obtaining the aimed effects.

Acetylcysteine solved this problem. Acetylcysteine is a stable derivative of cysteine. Acetylcysteine is also a precursor substance of glutathione, i.e., an endogenous antioxidative substance important to animals, and enhances the glutathione concentration in the body. Acetylcysteine is absorbed by internal organs to demonstrate the antioxidative action. In addition, acetylcysteine is deacetylated into cysteine in the liver; cysteine is incorporated into a metabolic pathway, and is converted into glutathione through biosynthesis. Although cysteine is the direct material for glutathione, cysteine, when orally taken, is oxidized as soon as it enters the body, and barely serves as the material for glutathione. For this reason, it is believed that acetylcysteine is effective in oral intake. Similarly to acetylcysteine, glutathione is also listed in the "list of raw materials exclusively used as pharmaceuticals," and use thereof is also approved as a fertilizer. Excess cysteine is metabolized with taurine, and is excreted.

Although it could be considered that giving cysteine is unnecessary because cysteine is generated from methionine, this is actually not the case. Use of methionine as a feed additive is "to supplement of nutrient ingredients of a feed and other effective ingredients," and methionine is given in an appropriate amount because it is added to adjust the balance of amino acid in the blend feed. Furthermore, to convert methionine into cysteine, methionine should follow a pathway, that is, should be once converted into homocysteine hazardous to the body, and then be converted into cysteine. Energy and nutrients are consumed during this pathway.

In other words, intake of cysteine is safer and more efficient. However, if orally taken, cysteine is not useful for the purpose described in the present invention because cysteine is unstable as described above. In fact, the feed to which methionine (DL-methionine) was added was given in the test above, and acetylcysteine was added to the feed to improve the productivity (feed conversion rate and growth rate).

Next, addition of cystine to feeds for all the animal species for the purpose of supplementing a sulfur component is approved in EU. This is the same purpose as that of addition of methionine. In Japan, use thereof to pigs is approved in the official specification of blend feeds for reducing environmental load. Taurine is also added to feeds for the same purpose as in methionine and cystine.

However, the application of acetylcysteine as a feed additive is "to promote the effective use of nutrient ingredients contained in the feed" specified in the feed safety enforcement regulations. In other words, its purpose of addition is different from those in the cases of methionine, cystine, and taurine. This remarkably appears as the difference in the amount thereof to be added. Although about 0.2% methionine is added to a standard basic feed for egg-laying hens, the standard amount of acetylcysteine to be added is 0.0014%, which is 0.7% (1/143) of the amount of methionine to be added.

0.25% methionine is added to the basic feed for chickens for meat for the first period of raising and 0.18% methionine is added to the basic feed for chickens for meat for the second period of raising. The average is 0.215%. The average amount of acetylcysteine to be added is 0.00097% and is 0.45% (1/222) of the amount of methionine to be added.

Furthermore, although not a feed additive, it might be considered that glutathione, i.e., an antioxidative substance important in the body is orally taken. However, even if orally taken, glutathione is decomposed during digestion, and therefore it is considered that intake of the precursor substance acetylcysteine is effective.

As described above, acetylcysteine has good results about an improvement in productivity (feed conversion rate and growth rate) of poultry (egg-laying hens, chickens for meat), and a reduction in cost and an increase in income are expected. Furthermore, because of the contribution to the health of chickens and the verified safety to human and animals, giving acetylcysteine as a feed additive for poultry including egg-laying hens and chickens for meat is rational, and it was verified that it can replace the growth promotion antibiotics.

Acetylcysteine needs to be continuously given because it is daily consumed. The expected effects of acetylcysteine, in addition to those described above, are an improvement in egg quality of egg-laying hens and an improvement in meat quality in chickens for meat. Consumers demand for safe and secure foods, and acetylcysteine which contributes to the health of livestock animals is a material assisting the production of safe and secure foods.

Although acetylcysteine was used as the substance to be tested in the first to third tests, it is inferred that not only acetylcysteine but also at least one selected from cysteine and cysteine derivatives can demonstrate the same effects. This is because these substances all have the common action in the animal bodies.

Acetylcysteine is absorbed in the body, is deacetylated into cysteine in the liver, and then is metabolized in the same pathway as that of cysteine. Because the effectiveness of methionine as the precursor substance of cysteine and that of cystine in the oxidized form of cysteine are verified in all animal species, it is inferred that acetylcysteine is also effective in all animal species. Acetylcysteine is reduced into cysteine when cystine acts in the body.

Although the egg-laying hen was selected as the target animal for the test in the first test and the second test and broiler was selected as the target animal for the test in the third test, it is inferred that acetylcysteine also has an effect of improving the feed conversion rate in other poultry species quail and turkey, and big animals such as cattle, pigs, and sheep. The reason is that many of the pharmaceuticals for animals, feed additives, and vitamins used for livestock animals are common between those for cattle, pigs, and poultry species. The reason is also that although the digestion and absorption mechanism in the animal body and the types and forms of the nutrients usable are different between the chicken breeds or between the livestock species, it is commonly found that the nutrients absorbed into the body are used to increase the amounts of muscles and bones. In other words, the reason is that because it is commonly found that muscles are formed of protein and bones are formed of calcium and phosphorus irrespective of chicken breeds and livestock species, the basics that the nutrients accumulate in the body are not different even if the sites of muscles which readily increase or the sites of fats which readily increase are different.

Although acetylcysteine was daily given to chickens at 1 mg/Kg in the first to third tests, a sufficiently high effect related to the feed conversion rate was obtained as apparent from the test data in FIG. 3. From this, it is inferred that it is effective in improving the feed conversion rate even if the amount of acetylcysteine daily given is reduced to about 0.5 mg/Kg.

Although the first test was performed during a period when heat stress was not applied to the egg-laying hens as the target animal for the test, it is inferred that if the agent for improving a feed conversion rate, the agent for improving a survival rate, or the agent for improving the number of eggs laid by an egg-laying hen according to the embodiment is given, the feed conversion rate can be also improved during a period when the inner temperature of the chicken house is beyond 27° C. and heat stress is applied to egg-laying hens.

This is for the following reason. That is, the test to verify the effects of the agent for improving a feed conversion rate, the agent for improving a survival rate, and the agent for improving the number of eggs laid by an egg-laying hen according to the embodiment is a test during a period when heat stress is not applied to egg-laying hens. As shown in FIG. 3, in which the number of deaths and cullings in the test zone reduced 20% relative to the number of deaths and cullings in the control zone, it is clear that the agent for improving a feed conversion rate, the agent for improving a survival rate, and the agent for improving the number of eggs laid by an egg-laying hen according to the embodiment enhance the stress resistance of the egg-laying hens. An antioxidative substance astaxanthin receives attention as a substance enhancing heat stress resistance of animals in the livestock industry. Cysteine and cysteine derivatives are also antioxidative substances, and have high possibilities to enhance the heat stress resistance of animals as well as astaxanthin.

The invention claimed is:

1. A method of giving an agent for improving a feed conversion rate for an egg-laying hen selected from all breeds of female chickens having a diet comprising the agent, the feed conversion rate being defined as a ratio of an amount of feed given to a total weight of eggs laid, the method comprising feeding the egg-laying hen a feed having acetylcysteine as an effective ingredient to improve the feed conversion rate, wherein the effective ingredient is fed to the egg-laying hen at a rate of about 1 mg/kg of body weight per day, and wherein the egg-laying hen is an adult hen capable of producing eggs.

2. The method according to claim 1, wherein the egg-laying hen is raised under no heat stress conditions.

* * * * *